US006901503B2

(12) United States Patent
Barlow et al.

(10) Patent No.: US 6,901,503 B2
(45) Date of Patent: May 31, 2005

(54) DATA PROCESSING CIRCUITS AND INTERFACES

(75) Inventors: Stephen John Barlow, Cambridge (GB); Alistair Guy Morfey, Cambridge (GB); James Digby Collier, Cambridge (GB)

(73) Assignee: Cambridge Consultants Ltd., Cambridge (GB)

( * ) Notice: Subject to any disclaimer, the term of this patent is extended or adjusted under 35 U.S.C. 154(b) by 528 days.

(21) Appl. No.: 10/032,985

(22) Filed: Oct. 29, 2001

(65) Prior Publication Data

US 2002/0161988 A1 Oct. 31, 2002

Related U.S. Application Data

(63) Continuation of application No. 08/809,498, filed as application No. PCT/GB95/02283 on Sep. 25, 1995, now Pat. No. 6,311,263.

(30) Foreign Application Priority Data

Sep. 23, 1994 (GB) .............................................. 9419246

(51) Int. Cl.[7] .......................... G06F 9/302; G06F 9/315; G06F 13/40; G06F 12/04
(52) U.S. Cl. ........................ 712/210; 712/223; 712/221; 712/36; 711/212; 710/307; 713/323; 708/205; 708/209; 708/503; 708/504
(58) Field of Search .......................... 712/36, 210, 221, 712/223, 225; 708/205, 209, 503, 506, 504; 710/307; 711/212; 713/323

(56) References Cited

U.S. PATENT DOCUMENTS 3,611,309 A  10/1971  Zingg ...................... 340/172.5
3,975,712 A  8/1976  Hepworth et al. .......... 340/147

(Continued)

FOREIGN PATENT DOCUMENTS

EP  0020185  12/1980  ............. G06F/7/50
EP  0055370  7/1982  ............. G06F/3/04

(Continued)

OTHER PUBLICATIONS

"High–Speed Real–Time Event Processor", *IBM Technical Disclosure Bulletin, vol. 30, No. 2*, IBM Corporation, New York, 632–634, (Jul. 1987).

(Continued)

*Primary Examiner*—Daniel H. Pan
(74) *Attorney, Agent, or Firm*—Schwegman, Lundberg, Woessner & Kluth, P.A.

(57) ABSTRACT

An integrated circuit contains a microprocessor core, program memory and separate data storage, together with analog and digital signal processing circuitry. The ALU is 16 bits wide, but a 32-bit shift unit is provided, using a pair of 16-bit registers. The processor has a fixed length instruction format, with an instruction set including multiply and divide operations which use the shift unit over several cycles. No interrupts are provided. external pins of the integrated circuit allow for single stepping and other debug operations, and a serial interface (SIF) which allows external communication of test dat or working data as necessary. The serial interface has four wires (SERIN, SEROUT, SERCLK, SERLOADB), allowing handshaking with a master apparatus, and allowing direct access to the memory space of the processor core, without specific program control. Within each processor cycle, the processor circuitry is divided into plural stages, and latches are interposed between the stages to minimize power consumption.

26 Claims, 13 Drawing Sheets

U.S. PATENT DOCUMENTS

| | | | |
|---|---|---|---|
| 4,342,082 A | | 7/1982 | Brown et al. ................ 364/200 |
| 4,486,750 A | | 12/1984 | Aoki .......................... 340/825 |
| 4,561,066 A | * | 12/1985 | Emmons et al. ............ 708/520 |
| 4,785,393 A | * | 11/1988 | Chu et al. ................... 712/221 |
| 5,274,770 A | | 12/1993 | Khim Yeoh et al. ........ 395/275 |
| 5,293,558 A | * | 3/1994 | Narita et al. ................ 708/605 |
| 5,668,970 A | | 9/1997 | Cowart et al. .............. 711/206 |
| 5,678,025 A | | 10/1997 | Ghori et al. ................ 395/462 |

FOREIGN PATENT DOCUMENTS

| | | | | |
|---|---|---|---|---|
| EP | 0108664 | | 5/1984 | ............ G06F/9/22 |
| EP | 0124402 | | 11/1984 | ............ G06F/9/26 |
| EP | 0171190 | | 2/1986 | ............ G06F/7/48 |
| EP | 0234187 | | 9/1987 | ............ G06F/5/00 |
| EP | 0242003 | | 10/1987 | ............ G06F/15/00 |
| EP | 0254648 | | 1/1988 | ............ G06F/13/42 |
| EP | 0394499 | | 10/1990 | ............ G06F/7/52 |
| GB | 1435406 | | 5/1976 | ............ G06F/13/00 |
| GB | 1593136 | | 7/1981 | ............ G06F/7/38 |
| GB | 2142507 | | 1/1985 | ............ H04L/11/16 |
| GB | 2159987 | | 12/1985 | ............ G06F/3/00 |

OTHER PUBLICATIONS

"Transfer of Subsystem Control Blocks and Termination Status Blocks Between System and Subsystem by Registers", *IBM Technical Disclosure Bulletin, vol. 37, No. 9*, IBM Corporation, New York, 147–148, (Sep. 1994).

Clarke, P., "Mini MPU Aims at ASICs", *Electronic Engineering Times*, 24, (Mar. 1991).

* cited by examiner

PROGRAMMERS MODEL

INSTRUCTION

DATA PROCESSING CIRCUITS AND INTERFACES

RELATED APPLICATIONS

This is a continuation under 37 CFR 1.53(b) of U.S. application Ser. No. 08/809,498, filed Mar. 24, 1997, now U.S. Pat. No. 6,311,263, which was filed under 35 USC 371 from PCT Application Serial No. PCT/GB95/02283 filed Sep. 25, 1995 and published as WO 96/09583 Mar. 28, 1996, which claimed priority from United Kingdom Application No. 9419246.5, filed Sep. 23, 1994, all of which applications are incorporated herein by reference.

The present invention relates primarily to single-chip data processing devices, but also to microprocessors and to digital circuits generally, and to interface circuits.

In the present day, many products incorporate microprocessor based data processing circuits, for example to process signals, to control internal operation and/or to provide communications with users and external devices. To provide compact and economical solutions, particularly in mass-market portable products, it is known to include microprocessor functionality together with program and data storage and other specialised circuitry, in a custom "chip" also known as an application-specific integrated circuit (ASIC). Field Programmable Gate Arrays (FPGA) such as those made by Xilinx™, Actel™ and Altera™ may also be used to implement such solutions.

However, for various reasons, the integrated microprocessor functionality conventionally available to an ASIC designer tends to be the same as that which would be provided by a microprocessor designed for use as a separate chip. The present inventors have recognised that this results in inefficient use of space and power in the ASIC solution, and in fact renders many potential applications of ASIC technology impractical and/or uneconomic.

Various aspects of the invention are defined in the appended claims, while the applicant reserves the right to claim any further aspects of the invention that may be disclosed herein.

In accordance with certain aspects of the present invention, microprocessor architectures are proposed which overcome the above drawbacks, being optimised for integration within an ASIC by providing a combination of functional features and architectural features unlike any conventional microprocessor.

For example, in a conventional general purpose microprocessor, the arithmetic and logic unit (ALU) has a certain data width (eight bits, sixteen bits etc.), and provides operations of arithmetic addition or subtraction, logical AND, OR combinations and left and right bit shifts, all on data of this basic width. One aspect of the invention disclosed herein is to provide a separate shifting unit, wider than the ALU width, which allows multiplication and division of two numbers, each as wide as the ALU itself, in a circuit of relatively small size. The shifter will typically be associated with one double-width register of the processor.

Other aspects of the invention relate to the provision of special functional features and interfaces within the chip and/or between the chip and the external environment. While these other aspects can be employed advantageously in the novel processor architecture proposed herein, it will be apparent that these specific techniques are in fact applicable and advantageous in a wide range of different microprocessor architectures, or even in the field of sequential digital circuitry generally irrespective of whether it is program-controlled or not.

As one particular such feature, the invention in another aspect provides, in a program controlled processor, a mechanism whereby response to external stimuli is provided automatically, but only at times known in advance to the programmer. Examples of such stimuli include requests for communication from external devices, and entry of "sleeping" state for power conservation. In the present embodiments, special instructions are defined whereby the programmer can define fixed periods in which external communication may take place, and fixed points for entry into the sleeping state.

The various aspects of the invention will become apparent from the following description of specific embodiments. These are presented by way of example only, with reference to the accompanying drawings, in which.

Figure 1:
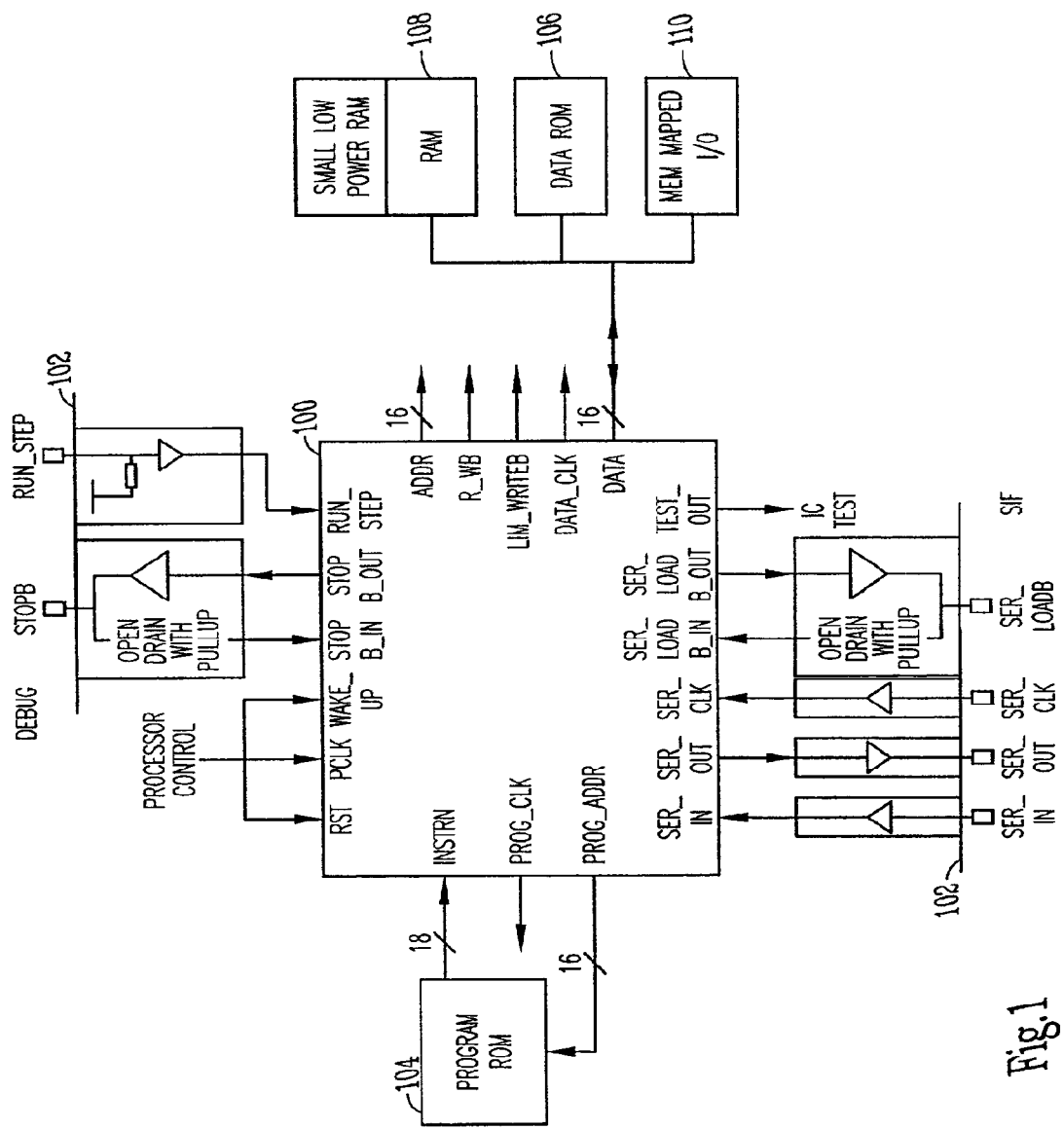
FIG. 1 shows the basic arrangement of an integrated circuit including a processor embodying the invention.

The description of the embodiments which follows includes the following sections:

Overview of the Specific Embodiment including a novel processor core

Basic Arrangement of the processor and associated hardware integrated within an ASIC Programmer's Model for the processor Instruction Set for the processor Data Architecture of the processor Pin Description together with detailed operation Construction and Operation of the Serial Interface (SIF)

Power Saving Features

Application Example—Domestic Gas Meter

Further Notes and alternative embodiments.

OVERVIEW OF THE SPECIFIC EMBODIMENT

Single chip solutions are ideal for many-products, and can comprise mixed mode CMOS circuitry such that analogue and digital signal processing can be performed on-chip. For some applications, however, there is a further need for more logic processing, for functions such as user interfaces, controlling $E^2PROMs$, networks and protocol conversions. Conventionally this requires a traditional microprocessor or microcontroller, which increases product size for two reasons. Firstly, the circuit board of a product has two chips instead of one, and secondly, the stand-by modes of conventional low-power processors still consume substantial power, so that the product requires a larger battery. The larger battery and bigger circuit board make the product quite expensive, while the need for communication between chips makes the system more sensitive to electromagnetic interference. There are many other disadvantages of a multiple chip solution.

There is clearly a desire for single chip solutions in which the processor, program storage and RAM are embedded in a single ASIC, to facilitate products such as: portable wireless products, instrumentation, utilities metering systems, low data rate radio systems, medical diagnostics, safety critical and verifiable systems, pagers, and certain sections of mobile telephones. Certain conventional designs can be reduced to a single ASIC by embedding a processor or a memory corresponding to the conventional external processor, if the ASIC can be made large enough. However, this goes only a small way to addressing the problems identified above.

The processor which is the subject of the present disclosure is a custom microprocessor which has been developed for use in ASIC designs. The requirements and trade-offs when designing for an ASIC are quite different from discrete designs, so the novel processor differs in a number of important aspects from a conventional microprocessor. As a result, ASIC designs that use the novel processor are lower cost, lower power and lower risk than those using existing processor designs. Some key features of the processor are as follows.

A very low gate count of, for example 3000 gates can be achieved, which compares with 8000 gates for an Intel 8051 microprocessor core. To efficiently support signal processing applications, the novel processor has powerful signed arithmetic functions including hardware multiply (16 bits by 16 bits), divide (32 bits by 16 bits) and normalisation, which are conventionally only found in much larger processor designs. In particular, a shift unit separate from the conventional ALU provides double-width shift operations, in cooperation with a pair of registers.

Power consumption is minimised in three ways. Firstly the architecture and instruction set have been chosen for power efficiency—especially the low power implementation of signal processing functions. Secondly, the detailed design minimises clatter and unnecessary transitions. Thirdly, when idle, the processor can enter a sleep mode, where it uses very little power. Furthermore, by use of static circuits, the circuit can stop the processor clock completely without loss of data, giving virtually zero power consumption. Special asynchronous circuitry monitors external wake-up signals with minimum power dissipation. These features complement the inherently lower power achievable with single chip designs to make possible new applications.

A built-in serial interface (the SIF) allows external access to the address space and processor registers. It is used to provide efficient IC manufacturing test (allowing testing of the processor, ROM, RAM and memory mapped peripherals), prototype device proving, and production board level test. It can also be used for ASIC to microprocessor communication in systems that use a tied external microprocessor, eliminating the need for separate interfaces and on-board circuitry for communications and testability functions.

The processor uses separate program and data spaces (a Harvard architecture), and the program instruction word can thus be wider or narrower than the data word. This is an example of where the on-chip nature of the design favours a different solution to the traditional microprocessor (von Neumann architecture) because the need for separate address busses on-chip does not cause any increase in the number of connections (pins) off-chip. On both address busses, the timing allows either synchronous or asynchronous devices. This is important as synchronous devices are often smaller and lower power than their asynchronous counterparts.

For verification and also to reduce gate count, the processor does not support interrupts. Instead, efficient polling instructions and the use of sleep/wake-up allow efficient multi-event responses. The processor has a RISC instruction set. Instructions are single word and mostly execute in a single cycle. Particular operations taking several cycles to execute are the Multiply (16 cycles), Divide (16 cycles) and Shift (variable) operations, which use the special shift unit mentioned above. There are four addressing modes: Immediate, Direct and Indexed by registers X and Y.

The processor is suitable for programming in a high level language such as 'C', or in assembler. The instruction set and addressing modes allow efficient, readable assembler programs to be easily written. The registers and addressing modes also allow effective compilation of high level languages such as C. However, it may be that, for efficiency and verification reasons, programs are best written in assembler, although development effort may be higher.

Basic Arrangement

FIG. 1 shows the basic arrangement of the novel processor core and associated hardware included in a single integrated circuit. The "core" of the processor is shown at 100, while the boundary of the integrated circuit is shown at 102. Various "pins" of the processor are defined, for communication with other functional units on the chip, and with the external world.

Also included on chip is program memory 104, fixed data memory (ROM) 106, data RAM 108 and memory-mapped input/output circuitry 110. The program space address bus is 16 bits wide and labelled PROG_ADDR, while the data space address bus (also 16 bits) is labelled ADDR.

"Pins" of the processor core which are connected to physical pins at the chip boundary 102 are related to the debug functions (pins STOPB, RUN_STEP) and to the serial interface (SER_IN, SER_OUT, SER_CLK, and SER_LOADB).

The person skilled in the art will appreciate that, in addition to the elements explicitly shown in the Basic Arrangement of FIG. 1, other analogue and/or digital signal processing functions will typically be provided within the ASIC itself, according to the particular application. Where high speed signal processing functions are to be performed by the ASIC, it will typically be desirable to have these performed by dedicated circuitry rather than by the programmed processor core described above, and to have less computationally intensive, but more logically complex parts of the required functionality implemented by the processor under program control. Therefore, for example, if a number of external analogue signals are to be sensed with a high bandwidth, and combined in accordance with predetermined repetitive algorithms to obtain a meaningful measurement, the A–D conversion and these high-speed processing functions can be performed by dedicated circuitry, and the measured value supplied periodically to the processor core via the memory mapped input/output circuitry. This principle is applied in the gas flow meter disclosed below as an example application, with reference to FIG. 11.

Programmer's Model

Figure 2:
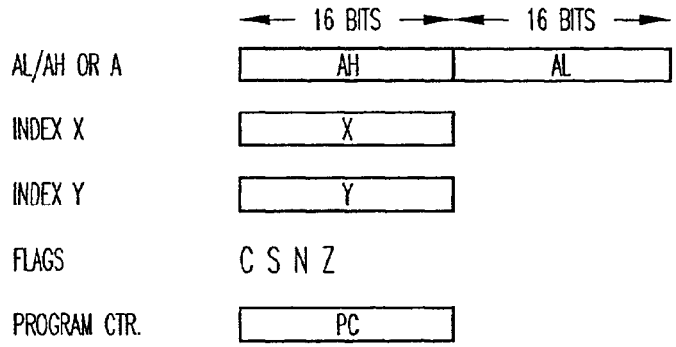
FIG. 2 shows the programmer's model and instruction format of the processor of the FIG. 1 circuit.
Figure 2:
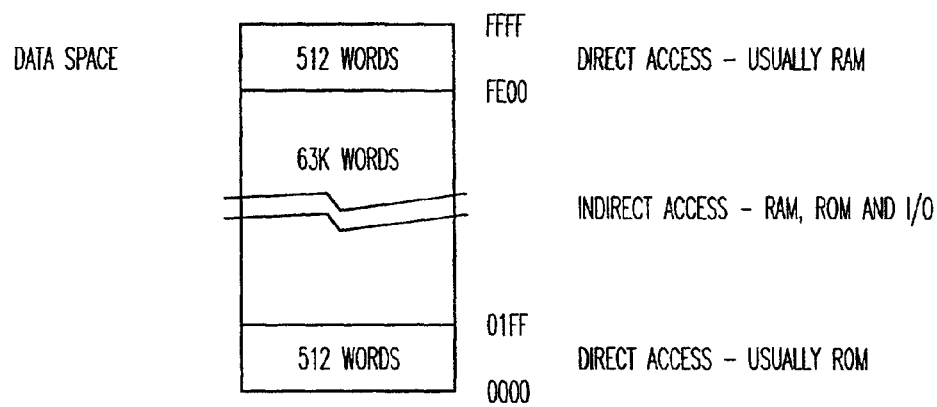
Figure 2:
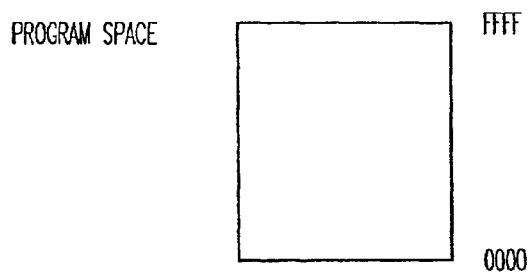
Figure 2:
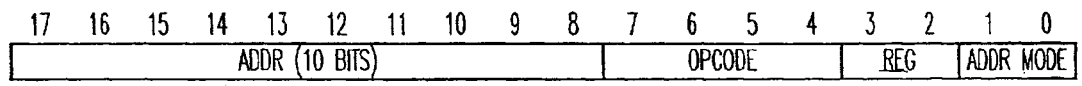

FIG. 2 shows the logical arrangement of internal registers and memory space of the processor of FIG. 1, commonly known as the programmer's model. Registers AH, AL, X and Y are provided for transient storage of data and address values within the processor core, together with a register for the program counter PC, and for various flags (C, S, N, Z) generated by the arithmetic and logic circuits of the processor.

The program storage space (memory 104) comprises 64K (65536 decimal) locations, each storing an 18 bit instruction word. The instruction words are of fixed format, and the format is illustrated at the foot of FIG. 2. Bits numbered 17 (MSB) down to 8 of the instruction word (hereinafter INSTRN[17:8]) contain an address value or data for the instruction. Bits INSTRN[7:4] contain an operation code (opcode) for the operation to be performed. Bits INSTRN[3:2] can be used to extend the operation opcode, and, in particular, are used by certain instructions to identify a particular storage register from among those shown in the programmer's model. Finally, bits INSTRN[1:0] identify an addressing mode for the current instruction.

In the data space (formed by memories 106, 108, 110) there are 64 K (65536 decimal) locations, each storing a 16 bit data word. 512 locations at the beginning of the data space (0000 to 01FF), and 512 locations at the end of the data space (FE00 to FFFF) can be addressed directly with the 10 address bits of each instruction word. The remaining 63 K locations can be addressed with indirect (for example indexed) addressing modes.

The instruction set implemented in this example processor will now be illustrated in the format of assembler language mnemonics, which will be readily understood by those familiar with the design or use of microprocessors.

INSTRUCTION SET

| ASSEMBLER | OPERATION | FLAGS SET |
|---|---|---|
| NOP | None (NB instruction all zeroes) | — |
| SLEEP | Enter sleep mode | — |
| PRINT | None (debug request for simulator) | — |
| SIF | Perform SIF access during instrn | — |
| LD reg, data | reg ← data | N Z |
| ST reg, data | data ← reg | N Z |
| ADD reg, data | reg ← reg + data | C S N Z |
| ADDC reg, data | reg ← reg + data + C | C S N Z |
| SUB reg, data | reg ← reg − data | C S N Z |
| SUBC reg, data | reg ← reg − data − C | C S N Z |
| NADD reg, data | reg ← − reg + data | C S N Z |
| CMP reg, data | flags ← reg − data | C S N Z |
| MULT data | A ← AH + AL × data | — |
| DIV data | AL ← A >> 1 ÷ data, AH[15:1] ← rem | — |
| TST data | flags ← data | N Z |
| BSR branch_addr | X ← PC + 1, PC ← branch_addr | — |
| SAL data | C ← [AH,AL] ← 0 | C |
| SAR data | AH[15] → [AH,AL] → C | C |
| SCL data | C ← [AH,AL] ← C | C |
| SCR data | C → [AH,AL] → C ct = data [3:0] 0..15 | C |
| OR reg, data | reg ← reg \| data | N Z |
| AND reg, data | reg ← reg & data | N Z |
| XOR reg, data | reg ← reg ^ data | N Z |
| BRA branch_addr | PC ← branch_addr | — |

-continued

INSTRUCTION SET

| ASSEMBLER | OPERATION | FLAGS SET |
|---|---|---|
| BLT branch_addr | If S = 1 PC ← branch_addr | — |
| BPL branch_addr | If N = 0 PC ← branch_addr | — |
| BMI branch_addr | If N = 1 PC ← branch_addr | — |
| BNE branch_addr | If Z = 0 PC ← branch_addr | — |
| BEQ branch_addr | If Z = 1 PC ← branch_addr | — |
| BCC branch_addr | If C = 0 PC ← branch_addr | — |
| BCS branch_addr | If C = 1 PC ← branch_addr | — |

ADDRESSING MODES

| Addr mode | Assembler format | "data" source/destination |
|---|---|---|
| *Address mode for instructions with "data"* | | |
| Immediate | #12 | data = addr16 |
| Direct | @12 | data = @addr16 |
| Indexed X | @(12,X) | data = @(X + addr16) |
| Indexed Y | @(12,Y) | data = @(Y + addr16) |

| Addr mode | Assembler format | "branch addr" new PC value |
|---|---|---|
| *Address mode for instructions with "branch_addr"* | | |
| PC relative | $+12 | branch_addr = PC + addr16 |
| Direct | @12 | branch_addr = @addr16 |
| X relative | 12, X | branch_addr = X + addr16 |
| Indexed Y | @(12,Y) | branch_addr = @(Y + addr16) |

In the above definition of the instruction set, and as mentioned above in relation to FIG. 2, the bits INSTRN[3:2] of the instruction word are used to identify registers in instructions having the operand "reg" only. Also: the '@' indicates "contents of"; 'addr16' is the 10 bit address value INSTRN[17:8] sign-extended to 16 bits; '12' is simply an example data value; while 'PC' indicates the address of the current instruction.

Data Architecture

Figure 3:
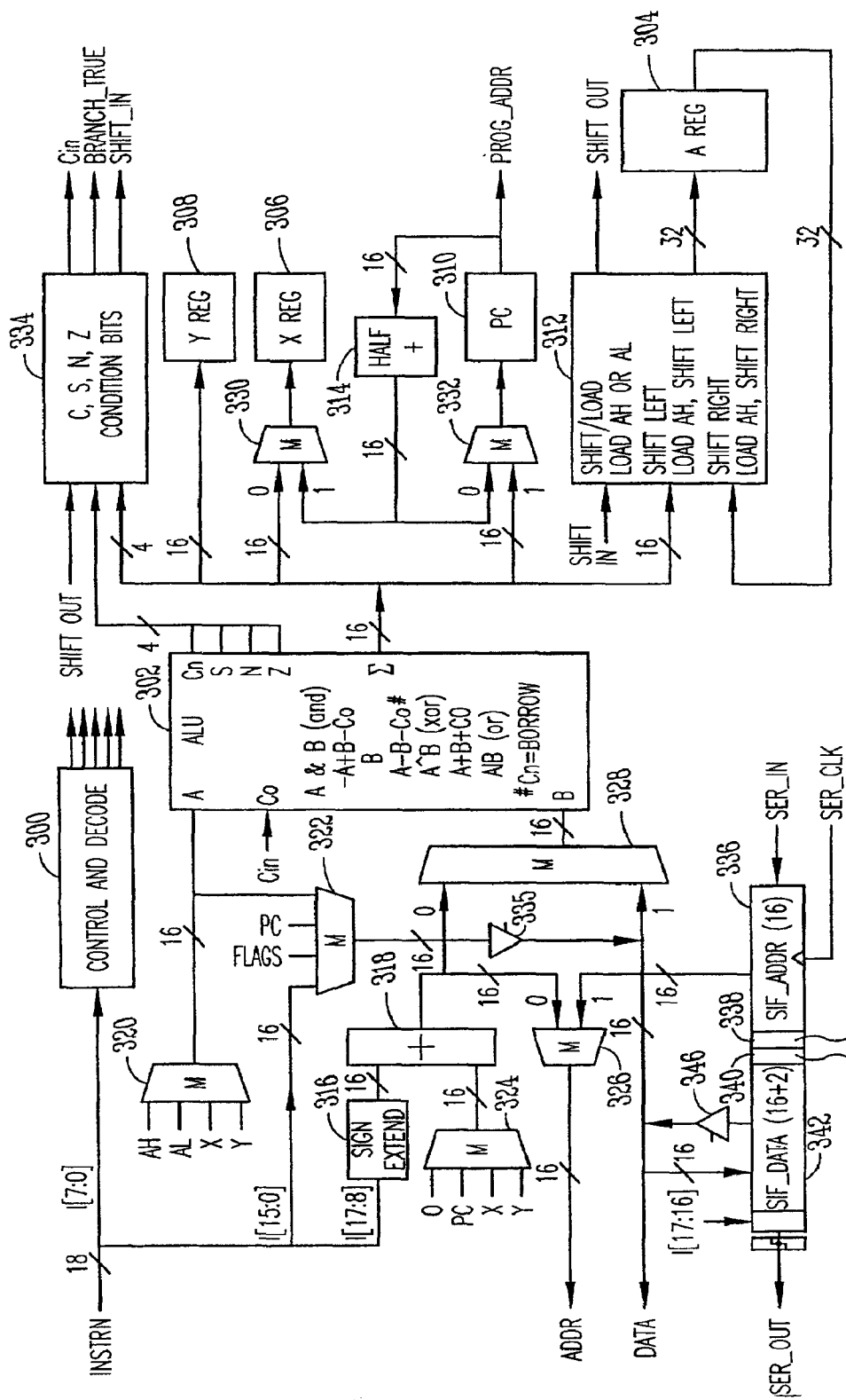
FIG. 3 shows the data architecture of the processor.

FIG. 3 shows in block form the data architecture of the processor core. The operation of all elements in a given cycle is controlled in accordance with one program instruction by a control and decode section 300. The principal elements of the data architecture are the arithmetic and logic unit (ALU) 302; the A register 304 (32 bits comprising AH and AL); X register 306 and Y register 308 (16 bits each); program counter (PC) register 310 (11 bits); shift/load logic 312; a PC incrementer 314, comprising a 16 bit half adder; an address sign extender 316; an address adder 318; various multiplexers 320 to 332; a flags and condition logic 334; and a tri-state buffer 335.

Communication with the program memory is via the program address bus PROG_ADDR and the instruction bus INSTRN. Communication with the data memory (including ROM, RAM and memory mapped I/O circuits) is via the data address output ADDR and the bi-directional data bus DATA. Also provided is the serial interface register having an address part 336 (bits SIF_ADDR[15:0]), an address space determining part 338, a read/write control part 340, and a data part 342 of eighteen bits. Also associated with the serial interface is a tri-state buffer 346.

The operation of the processor in execution of instructions will now be described.

Instructions are read from the INSTRN bus, where they have been latched after read-out from the program ROM 104. The lowest eight bits of the latched instruction I[7:0] determine the operation to be performed and are passed to the control and decode section 300 which sets up the data architecture multiplexers 320 to 332 and controls the sequence of instruction execution. The top 10 bits of the latched instruction I[17:8] specify an address or immediate value for the instruction.

As well as instruction execution, the data architecture provides the pathways for SIF operations. The architecture will now be described as it applies in detail to each class of instruction and SIF operation.

ALU Basic Functions

The ALU 302 has two inputs A and B of 16 bits each, and a 16 bit output $\Sigma$. A carry bit input C0 is provided, and flag outputs Cn, S (sign), N (negative) and Z (zero). The basic functions implemented by the ALU under control of the control and decode section 300 are listed within the block 302 in FIG. 3. The options in each cycle are: (1) to perform a logical AND of the A and B inputs; (2) to add the negative of A to B while subtracting the input carry bit C0; (3) to pass B directly to $\Sigma$; (4) to subtract B from A with subtraction of the carry bit C0, outputting Cn=1 in the case of a "borrow"; (5) to output the logical exclusive —OR (XOR) of A and B; (6) to output A+B+C0 (add with carry); and (7) to output the logical OR of A and B. The majority of instructions are two operand instructions, taking one operand from a register, the other from memory or as an immediate, and returning the result to the same register. The ALU A input receives the register input and the ALU B input the memory/immediate value. The ALU performs the required logical or arithmetic operation and presents the result on the $\Sigma$ output from where it can be written back into the same register. For the AL/AH registers 304, the additional shift/load block 312 is inserted between $\Sigma$ db the registers. This allows shift operations to be performed on the combined register pair and is also an integral part of the scheme by which multiply and divide are performed in this embodiment.

No Operand Instructions: NOP, BRK, PRINT, SIF

NOP, BRK, PRINT and SLEEP do not involve the data architecture at all. SIF executes as a SIF cycle if a SIF request is pending (described more fully below), otherwise it behaves as a no-op.

Data Address Modes

Memory/immediate values are generated and applied to the ALU B input, using the multiplexers 320, 322, 324, 328 and neighbouring components. There are four data address modes: Immediate, Direct, Indexed X and Indexed Y. Immediate takes a value directly from the instruction (I[15:0]). The other modes use the instruction value to select a value from memory. The top 10 bits of the latched instruction are sign extended at 316 to 16 bits. To this is added (318) either zero (Immediate or Direct), X (Indexed X) or Y (Indexed Y) as selected by multiplexer 324. The output of adder 318 is fed to the ADDR bus via multiplexer 326, For immediate values multiplexer 328 counts the output of adder 318 directly to the ALU B input. For other modes, multiplexer 328 selects the DATA input, containing the value read from memory.

Single Memory/Immediate Operand Instructions: LD, TST

The appropriate memory/immediate value is generated on the ALU B path as described above. This is passed unchanged through the ALU 302 by setting it to 'B'. In the case of LD, the result $\Sigma$ is written to the appropriate register. In both cases, the N and Z flag values from the ALU are loaded into their flag bits.

Store Instruction: ST (and PRINT)

This is the only instruction that writes to memory. The register whose value is to be stored is selected by multiplexer 320 on the ALU A path. This is then routed via multiplexer 322 and tri-state buffer 335 to the DATA bus. The store address is formed in exactly the same way as for a normal memory/immediate operand instruction. The storing of data prior directly, rather than via the ALU avoids the need for special timing for this instruction.

The ST instruction sets the flags. For the valid addressing modes, multiplexer 328 is always set to 1 (DATA), so the stored value is also presented on the ALU B path. By selecting ALU operation 'B', the ALU generates N and Z flag values which can be loaded into their flag bits.

The opcode for ST with the Immediate addressing mode does not make sense and is used for the PRINT instruction. This has special meaning to a simulator and gate level debugger for use in developing the ASIC, but is executed by the processor as a no-op.

Dual Operand Instructions: ADD, ADDC, SUB, SUBC, NADD, CMP, OR, AND. XOR

These instructions operate between a register and a memory/immediate value, returning the result to the same register. The register value is presented on ALU input A via multiplexer 320. The memory/immediate value is presented on ALU B input as above.

The result $\Sigma$ from the ALU is fed to the appropriate register. For these instructions multiplexer 330 and the shift/load unit 312 are both set so that $\Sigma$ is propagated unchanged to X, AH and AL as well as Y. The appropriate register only is clocked.

Arithmetic instructions set all four FLAG bits out of the ALU. Logical instructions set only the N and Z bits.

Branch Instructions: BRA, BLT, BPL, BNE, BEO, BCC, BCS

Normally multiplexer 332 is set to 0 so that at the end of each instruction, PC is clocked and the program counter increments. PROG_ADDR, the address in program space, is equal to the PC value.

When a branch instruction is executed, if BRANCH_TRUE is high (output by the condition logic 334), multiplexer 332 is switched to 0 so as to load a new PC value from ALU output. Otherwise, the PC increments, as normal. BRANCH_TRUE checks the branch condition by reference to the appropriate flag bits, using a multiplexer which is hard wired to the appropriate instruction code bits.

The branch address (new PC value) can be specified using one of four addressing modes. These are similar to the data addressing modes and the same hardware to generate them. The four modes are Direct, PC relative, X relative and Indexed Y. Multiplexer 324 is set to add the correct register/value (inputs 0 to 3 respectively) to the sign extended value specified in the instruction. Multiplexer 328 selects its input 0 for immediate modes PC relative and X relative, and selects 1 for Direct and Indexed Y.

Note that the PC value used for PC relative addressing is that of the branch instruction itself, as the processor does not pre-increment the program counter. One use of the Relative X mode is to return from subroutines (as the return address is stored in the X register).

The new PC value is presented on the ALU B path. The ALU is set to 'B' and the value routed through to $\Sigma$ where it can be loaded into PC.

Branch to Subroutine Instruction: BSR

BSR is identical to the unconditional branch BRA, except that the return address is stored in the X register (return address is the current PC+1). This is achieved by the 1 input of the multiplexer 320 on the input to the X register which allows the incremented PC to be loaded into X whilst the main ALU pathway is used to transfer the new PC value of the branch address. Multiplexer 320 is used only for this instruction.

Shift Instructions: SAL, SCL, SAR, SCR

The shift instructions operate on the combined AL/AH register 'A' and are performed entirely locally to the shift/load logic 312—the ALU is not involved. This allows the shift operations to be performed over the full 32-bit A register, while the ALU retains is compact, 16-bit size. Shifts are performed by successive one bit shifting in this embodiment requiring simply 32 three-way multiplexers, to give left shift, no shift or right shift per bit. Six different operations are possible, the appropriate one being selected by the control unit 300 in accordance with the current instruction: (1,2) load AH or AL directly with no shift; (3) shift AH and AL left; (4) load AH while shifting left; (5) shift AH and AL right; and (6) load AH while shifting right.

The number of bit positions to shift is specified as a memory/immediate value to the instruction. This is read off from the ALU B path by the control architecture and used to generate the appropriate number of cycles. Each cycle then shifts by one bit left or right.

In the conditioning logic 334, the SHIFT_IN value is selected to allow the carry flag C to be shifted in for SCL/SCR shifts, zero to be shifted in for SAL, and the current sign bit (AH bit 15) to be shifted in (extended) for SAR.SHIFT_OUT, the bit shifted out of A is loaded into the carry flag C with each bit shifted.

Multiply Instruction: MULT

Figure 4A:
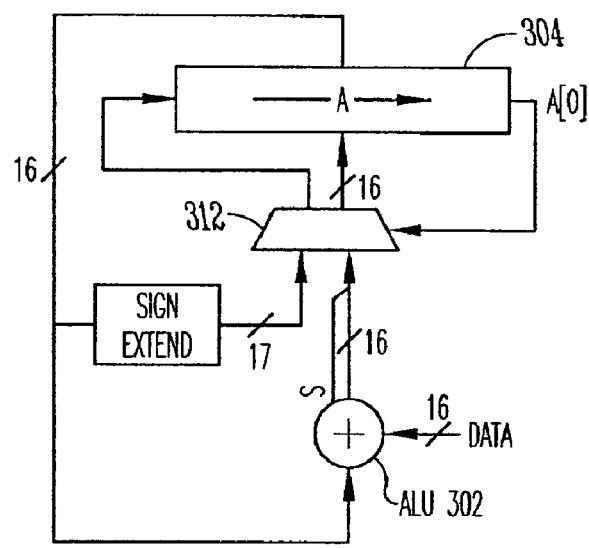
FIGS. 4A and 4B illustrate the execution of multiply and divide operations in the processor of FIG. 3.

Multiply is performed by repeated shift and add and takes 16 cycles. The algorithm uses a combination of the ALU 302 and the shift/load logic 312, shown schematically in FIG. 4A for one cycle. The shift/load block 312 is multiplexer controlled by the instruction decoder and, during MULT, by the current lowest bit A[0] in the A register. One of the operands is the initial value of AL, the other is a memory/immediate value presented on ALU input B. The result is produced in AH/AL. The initial value of AH acts as an addend to the result, and AH should normally be cleared before the operation. As shown by the asterisk (*), the ALU 302 executes an addition for the first 15 cycles, but a subtraction in the last cycle.

In pseudo code, the algorithm is as follows. A is the concatenation of AH and AL. {} indicates bit concatenation. Repeat 16 times

```
If last time round loop then op = SUBTRACT else op =
ADD
If A[0] == 1 then
    A[31:15] := A[31:15] op ALU_B       --add (*) ALU_B
                                        into top 16
                                        bits
    A[31:0]:= {ALU_S,A(31:1]}           -- shift right
else
    A[31:0]:= {A(31],A[31:1]}           --sign extend
                                        shift right
end if
end
```

The ALU calculates A[31:15] "op" ALU_B on each cycle ("op" is either "plus" or "minus", set by the control architecture according to the cycle). A[0] is fed to the control architecture. This then sets the shift/load logic 312 accordingly, either to sign extend shift right (when A[0]=0) or to load AH and shift right shifting in ALU sign flag S (A[0]==1).

Divide Instruction: DIV

Figure 4B:
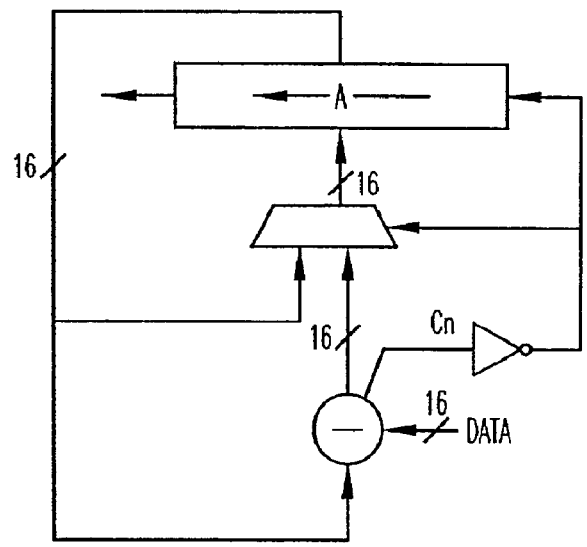

Divide is performed by repeated subtraction and takes 16 cycles. Again, the algorithm uses a combination of the ALU 302 and the shift/load logic 312, as shown schematically in FIG. 4B. The dividend is the initial value of AH, AL, the divisor is a memory/immediate value presented on ALU input B and the result and remainder are generated in AH, AL. The pseudo-code for DIV is:

Repeat 16 times

```
ALU_RESULT:= A[31:15] – ALU_B
If ALU_CN == 1 then
    A[31:0]:= {A[30:0],0}      shift left, ←0
else
    A[31:15]:= ALU_RESULT      --subtract    ALU_B
                               from top 16 bits
    A[31:15]:= {A[30:0],1}     --shift left, ←1
endif
end
```

The ALU calculates A[31:15] minus ALU_B on each cycle, and according to the value of ALU_CN, the control architecture sets the shift/load logic 312 either to shift left (when ALU_CN=0) or to load AH and shift left (when ALU_CN=1).

SIF Cycles

There are four cases of SIF cycles: memory read, memory write, register read and register write. These will be described more generally later, with reference to the generalised embodiment if FIG. 7. Briefly, and with reference to FIG. 3, SIF memory read cycles set multiplexer 326 to the SIF address and load the result directly and in parallel from the DATA bus into the SIF DATA register 342.

SIF memory write cycles set multiplexer 326 to the SIF address and write directly from the SIF_DATA register 342 to the DATA bus via the SIF_WRITE tri-state buffer 346.

SIF register read cycles use the DATA bus as an intermediate. The register to be read is selected using multiplexers 320 and 322. This can be AH, AL, X, Y, PC, flags or the current instruction This value is enabled onto the DATA bus via tri-state buffer 335 and from there to the SIF_DATA register 342 as if it were a memory read. Note that the top 2 bits of the current instruction are fed directly to the SIF_DATA register and will be loaded for any SIF read operation. These bits are only of interest when reading from the current instruction, however. Since each instruction word is eighteen bits wide, the DATA bus alone can only be used to carry the lowest sixteen bits.

SIF register write cycles again use the DATA bus as an intermediate. The value to be written is gated onto DATA via SIP_WRITE tri-state buffer 346 and from there through the ALU on the B path. ALU output Σ can then be loaded into the appropriate register.

Pin Description

The following provides a complete and detailed description of the function of each of the "pins" of the processor core. As shown in the basic arrangement of FIG. 1, some of these pins are connected to physical pins of the integrated circuit (ASIC), while most are connected only internally of the integrated circuit. In the following description of pin functions, the pin name and a pin type input, output or bi-directional (tri-state) is presented. The functions and operations of the pin are then described.

FIGS. 5A to 5G of the drawings are presented to illustrate the waveforms present on the pins, as described below.

RST (input)—Asynchronous reset. Resets processor to known state.

| | |
|---|---|
| Registers and flags | 0 |
| Sleep state | Awake |
| Run/Stop state | Run |
| SIF cycle | None pending |

On releasing RST the processor will start executing code from address 0. The internal reset signal is held active until a falling clock edge after RST is released to ensure a clean restart.

Figure 5A:
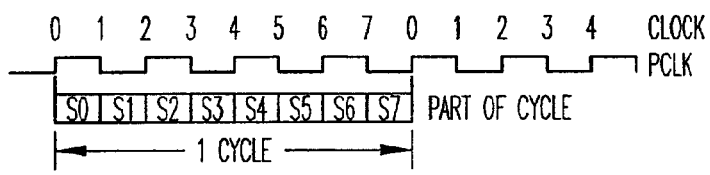
FIGS. 5A to 5G show waveforms illustrating various functional features of the circuit of FIG. 1.

PCLX(input)—Processor clock. As shown in FIG. 5A, each processor cycle requires 4 PCLK clocks. Both edges of the clock are used. Cycles always start on a rising clock edge and comprise this and the following 7 clock edges. The edges are referred to as clock 0 through clock 7 and the parts of the cycle are numbered according to the clock they follow. PCLK may be stopped and restarted at will to switch the processor on and off. Note that output signals will freeze in whatever state they were in and that the processor will not be sensitive to any input signals except RST whilst the clock is stopped.

The 4 clock sequencer is disabled when the processor is idle. The phase of cycles is therefore not fixed from reset for all time. Most processor instructions execute in a single cycle.

Figure 5B:
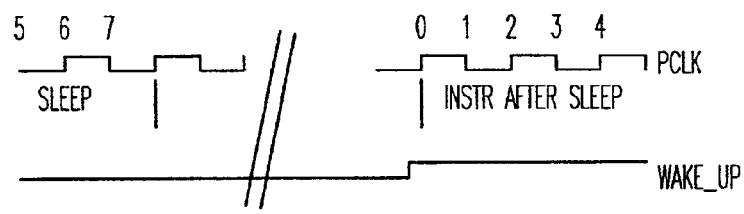

WAKE_UP (input)—Wakes the processor from sleep. As shown in FIG. 5B, when the processor executes the SLEEP instruction it goes into a sleep mode where activity is minimised and the power consumption is very low. WAKE_UP is then sampled on the rising edge of every PCLK and the processor wakes up and restarts with the instruction following SLEEP when a 1 is detected. In terms of the cycle, the PCLK rising edge where the 1 is detected is clock 0. Note that if WAKE_UP is held at 1, SLEEP behaves just like a NOP.

STOPB_OUT (output), STOPB_IN (input), RUN_STEP (input)—Processor start/stop, breakpoint and single step debug facility. This is intended only for debugging and is not for use by the application. These signals must be brought out to outside pins STOPB and RUN_STEP via pads as shown. The description that follows describes the pin level behaviour.

The processor is either running or stopped. This is a top level state above whether it is asleep or awake. STOPB is open-drain with an internal pullup and is normally high.

Figure 5C:
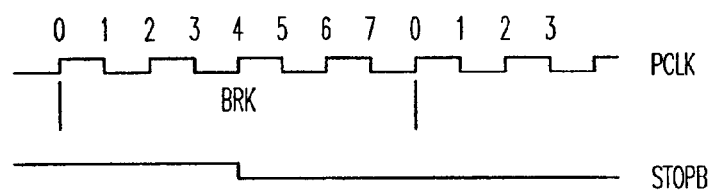

As shown in FIG. 5C, when the processor executes the BRK instruction, it drives STOPB low and stops. This indicates to the outside world that the processor has hit a breakpoint. The processor can be manually stopped by pulling STOPB low externally during a rising PCLK edge. The processor immediately takes over holding STOPB low and will stop at the end of the current instruction.

Figure 5D:
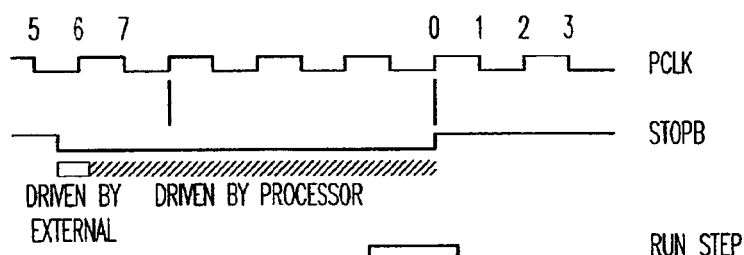

RUN_STEP is an input with a built-in pullup. As shown in FIG. 5D, when high, it forces the processor into the run state. RUN_STEP over-rides STOPB, so that if it is held high, the processor will run continually ignoring breakpoints and stop requests. In normal use, the pin should be allowed to pull itself into this condition. For debug, RUN_STEP should be normally low. Breakpoints are then enabled. Note that this means that strategic breakpoints can be left in the final code and enabled by control of RUN_STEP. This is a powerful tool for test and verification purposes. RUN_STEP is then taken high for one clock to restart the processor.

Figure 5E:
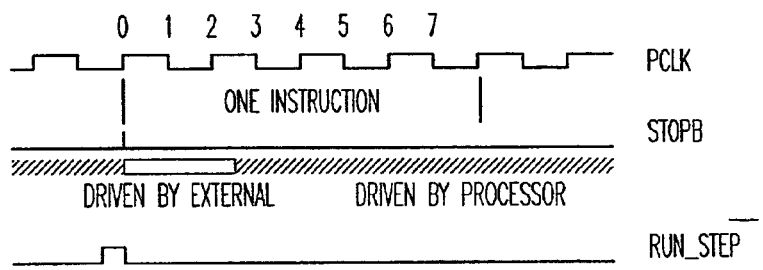
Figure 5F:
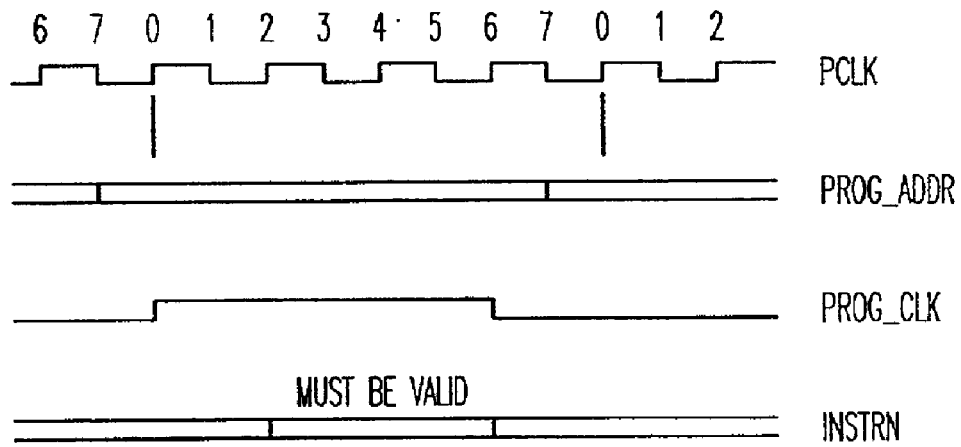
Figure 5G:
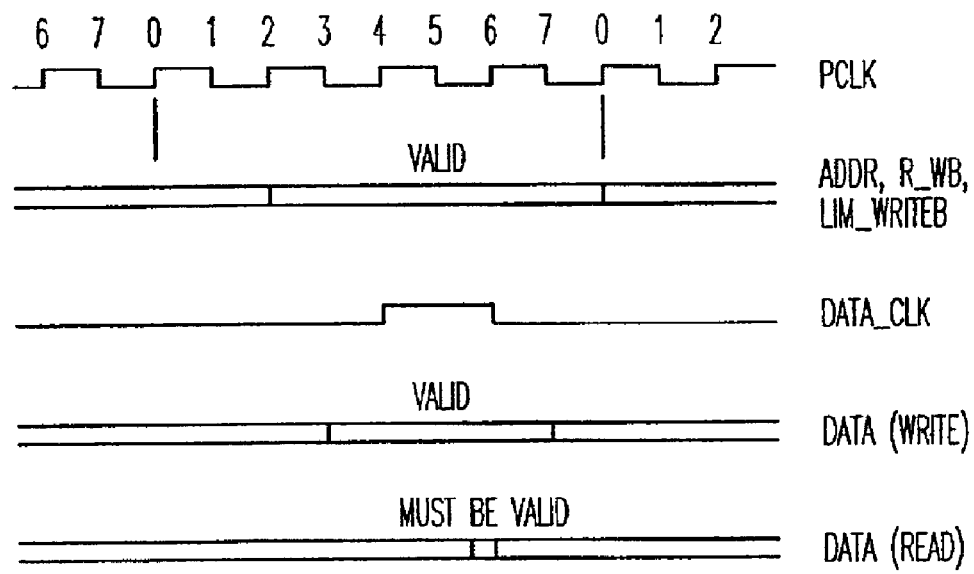

As shown in FIG. 5E, single stepping requires control of both STOPB & RUN_STEP (illustrated for single cycle instruction):

| | |
|---|---|
| (1) | Take RUN_STEP high |
| (2) | Wait until STOPB rises |
| (3) | Take RUN_STEP low and drive STOPB low. |
| (4) | Wait ≧ 1 clock |
| (5) | Release STOPB |

PROG_ADDR (output), PROG_CLK (output), INSTRN_(input)—Program space memory interface. Unclocked or clocked ROMs can be used. PC is the instruction address (16 bits). As shown in the FIG. 5F waveforms PROG_CLK is the clock for clocked ROM (active rising edge) and INSTRN is the instruction data (18 bits).

For multi-cycle instructions, PROG_CLK rises on the first cycle, stays high from intermediate cycles and falls on the last cycle. PC changes only on the last cycle.

ADDR, R_WB (output), LIM_WRITEB (output), DATA_CLK (output), DATA (bidirectional)—Data space memory interface. Unclocked or clocked memory can be used. ADDR is the address (16 bits). R_WB is the read/write select line, LIM_WRITEB allows protection of parts of the memory space from SIF writes, DATA_CLK is a cycle strobe which also acts as a clock for clocked memory and DATA is the bidirectional data bus (16 bits). See the waveforms of the FIG. 5G.

If an instruction does not require a memory cycle, DATA_CLK will stay low. For multi-cycle instructions, DATA_CLK will go high on the first cycle, stay high for intermediate cycles and go low on the last cycle. ADDR etc will stay valid from the first cycle to the last cycle.

LIM_WRITEB is normally high. It goes low when a write to memory is requested from the SIF in normal operation (as opposed to in debug with the processor stopped). Including this signal in an address decode prevents user writes to the decoded device from the SIF. This is necessary for protecting some applications against accidental damage. Other devices may be written from the SIF, allowing for instance communication between the ASIC and a general purpose microcontroller.

TEST_OUT (output)—IC test output. An XOR of the ALU output bus which can be used to give visibility of processor operation for IC test. It is either brought out as a specific pin or included in an XOR tree which is externally visible. SER_IN (input), SER_OUT (output), SER_CLK (input), SER_LOADB_OUT (output), SER_LOADB_IN (input)—Serial interface (SIF). These signals are brought to outside pins SER_IN, SER_OUT, SER_CLK and SER_LOADB via pads as shown. The description that follows describes the pin level behaviour.

The SIF provides a method for transferring data serially into and out-of a device, by means of a shift register in the device. The present processor uses a SIP shift register length of 36 bits. The data input to the shift register is SER_IN and the data output SER_OUT. SER_CLK is the clock. Data is clocked into the shift register on the negative edge, and out on the positive edge. SER_CLK is completely asynchronous to the processor clock and can be faster or slower than it if required. Data is clocked in and out MSB first. SER_LOADB is used to co-ordinate transfers via the shift register.

The serial interface allows (1) the program space to be read, (2) the data space to be read and written and (3) the processor registers to be read and written. In normal running, SIP transfers are only carried out when a SIF instruction is executed. When the processor is asleep or stopped, SIF transfers are carried out immediately, starting the cycle engine for one cycle to perform the transfer. In normal running, the registers and limited data space areas cannot be written. In stopped state the registers and the full data space be written to.

SER_LOADB is an open-drain output with an internal pullup. To perform a cycle, the shift register is loaded and SER_LOADB pulled low for $\geq 1$ clock. The process detects the transfer request and holds SER_LOADB low until the cycle has been completed. This handshake system is robust and places no timing constraints on either side of the interface. SER_CLK must be low when SER_LOADB is low to allow the shift register to be loaded by the processor.

Figure 6:
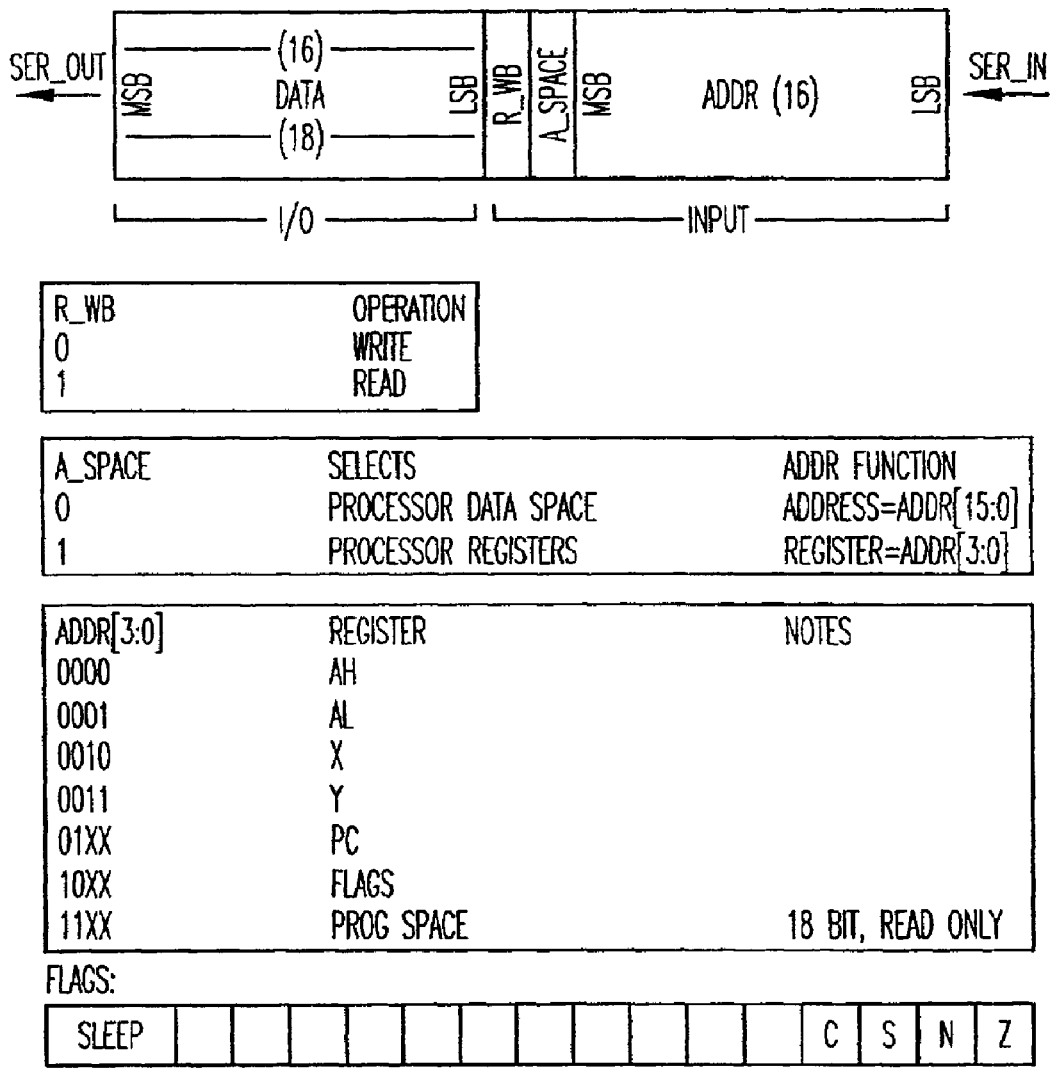
FIG. 6 is a schematic diagram of a serial interface (SIF) similar to that of the circuit of FIG. 1.

FIG. 6 shows the SIF shift register arrangement. The operation of the SIF will be described in more detail below. The SLEEP bit is read only. Undefined bits read as 0.

Program space read operations, read from the PC address and increment PC. This allows sequential reads without specifically setting up an address. The definition allows just '1's to be shifted into SER_IN as the data is read out to repeat.

Notes

Literals which are outside the range −512 . . . +511 can be automatically implemented as direct by the assembler with the value stored in data ROM. From the user point of view it will seem that full range literals are available.

Branch targets which are outside the PC relative range can be automatically implemented as direct by the assembler with the offset stored in data ROM. From the user point of view it will seem that branches to anywhere in address space are available. When executing a PC relative branch, PC points to the branch instruction itself.

Subroutine calls use the X register for the return address:

|      | BSR | fred | ; Branch to subroutine with BSR |
| ---- | --- | ---- | --- |
| fred | ... |      | ; Subroutine |
| :    | BRA | 0, X | ; Return with BRA |

If the subroutine itself calls a subroutine or otherwise uses X, it must be saved in memory and restored before exit. Conditional returns can be implemented by using BCC instead of BRA. Multiple exit points can be implemented by returning to 0,X or 1,X etc.

Addition and subtraction operations work on signed or unsigned, integer or fractional values. ADD, ADDC and NADD treat C as a carry. SUB, SUBC and CMP treat C as a borrow. ADDC and SUBC facilitate straightforward multi-precision arithmetic. The S flag applies to operations on signed values and gives the true sign of the result, independent of overflow into the MSB. It is calculated as N^V and is especially useful for CMP where it indicates signed "less than" (N only indicates this over a limited operand range).

MULTiply is signed. Integer and fractional multiplies are implemented as follows ("&" is the assembler macro parameter substitution operator):

| IMULT data | ; Multiply integers AL * data. Result in A |
| --- | --- |
|  | LD    AH, #0 |
|  | MULT  &data |
| FMULT data | ; Multiply fractionals AL * data. Result in A |
|  | LD    AH, #0 |

-continued

|  | MULT  &data |
| --- | --- |
|  | SAL   #1 |

Integer multiply never overflows, even if AH is non-zero to add to the result. Fractional multiply only overflows when multiplying −1.0 by −1.0. AH adds to the result as a signed fractional divided by $2^{15}$, and cannot precipitate overflow.

Unsigned integer multiply is implemented by a macro:

| UIMULT data, temp | ; Multiply unsigned integers AL |
| --- | --- |
|  | ; and data. Result in A |
|  | ; temp is a workspace RAM |
|  | ; location that must be supplied |
|  | LD    AH, #zero |
|  | ST    AL, @&temp |
|  | MULT  &data |
|  | TST   &data |
|  | BPL   $+2 |
|  | ADD   AH, @&temp |
|  | TST   @&temp |
|  | BPL   $+2 |
|  | ADD   AH, &data |

However, if the code of UIMULT is used without zeroing AH it does not provide an unsigned multiply/accumulate, as AH is added as a signed value (sign extended).

DIVide is signed, positive only (MSB of A and data must be zero). Positive integer and fractional divides are implemented by macros in the assembler as follows:

| PIDIV data | ; Divide +ve integers A ÷ data. |
| --- | --- |
|  | ; Result in AL, remainder in |
|  | ; AH[15:1], AH[0] = 0 |
|  | SAL   #1 |
|  | DIV   &data |
| PFDIV data | ; Divide +ve fractionals A ÷ data. |
|  | ; Result in AL, rounding bit |
|  | ; AH[15] |
|  | DIV   &data |

Note that A is a long integer or a double precision fractional in the above. IDIV and FDIV will overflow if AH≧data. No indication of overflow is provided.

To implement a full signed divide, the operands must be made positive before the divide and the result corrected afterwards.

Shifts can be from 0 to 15 bits. A 0 bit shift leaves A unchanged and sets C as if a 1 bit shift had been performed. This can be used to get the top or bottom bit of A into C.

Some other instructions common on other processors are implemented as macros:

| CLC | ; Clear carry bit. Note affects S, N, Z |
| --- | --- |
|  | ADD   AL, #0 |
| SEC | ; Set carry bit. Note affects S, N, Z |
|  | NADD  AL, #−1 |
|  | XOR   AL, #H'FFFF |
| NEG reg | ; Negate reg. C is set as carry. NEG |
|  | ; instrn often sets as borrow |
|  | NADD  & reg, #0 |
| NEGA | ; Negate 32 bit A register. Note C set ; |
|  | as carry |
|  | XOR   AL, #H'FFFF |

```
            NADD    AL, #0
            ADDC    AH, #0
    RTS             ; Return from subroutine
            BRA     0, X
```

Branch instructions for the full range of signed and unsigned comparisons are implemented as macros:

```
BHI branch_addr      ; Branch higher (unsigned)
                     BCS   &skip
                     BNE   &branch_addr
                     &skip:
BHS branch_addr      ; Branch higher or same (unsigned)
                     BCC   &branch_addr
BLO branch_addr      ; Branch lower (unsigned)
                     BCS   &branch_addr
BLS branch_addr      ; Branch lower or same (unsigned)
                     BCS   &branch_addr
                     BEQ   &branch_addr
BGT branch_addr      ; Branch less than (signed)
                     BLT   &skip
                     BNE   &branch_addr
                     &skip:
BGE branch_addr      ; Branch greater or equal (signed)
                     BLT   &skip
                     BRA   &branch_addr
                     &skip:
BLE branch_addr      ; Branch less than or equal
                     BLT   &branch_addr
                     BEQ   &branch_addr
```

The primitives BLT, BEQ and BNE complete the set.

It is best to avoid using manual PC relative branch (e.g. BRA $+1). These will not work correctly in the multiple instruction macros above and in general make assumptions about instruction lengths which can cause problems when branching over macros.

BRK, if it causes the processor to stop, leaves PC pointing at the BRK instruction. If it is over-ridden by the external signal RUN_STEP, BRK behaves as a NOP.

PRINT is a debugging aid. It is a NOP as far as the processor is concerned but is detected by a gate level model debugger and a simulator and, if enabled, will print out the instruction's immediate value and specified register. The immediate value can be used to indicate the position in the program. The register value may or may not indicate some useful result.

Multi-word variables can be stored in memory MS word first, as a convention. There is nothing in the instruction set to define an order. The following code fragment shows a multi-precision subtract:

```
LD      AL,@(var1+1)    ; Subtract var1 – var2
SUB     AL,@(var2+1)
LD      AH,@var1        ; Result in A. C,S,N correct for
                        ; 32 bit
SUBC    AH,@var2        ; result. Z set on MS word only
```

The Y register can be used as a software controlled stack pointer. The mnemonic "SP" is recognised in place of Y by the assembler. When used as a stack, Y points to the lowest used memory word in the stack. The following illustrates the use of Y for storing the return address and local variables for a subroutine:

```
fred        LABEL
fred_s      STRUC                           ; Define local
                                            vars in struct
var1        DS      1
var2        DS      1
fred_s      ENDS
            ST      X,@(-1,SP)              ; Store return
                                            address
            SUB     Y,#(LENGTH fred_s       ; Allocate space
                    +1)
            ...
            ...     @(.var1,SP)             ; Local variable
                                            address
            ...
            ADD     Y,#LENGTH fred_s        ; Return space
                    + 1)
            BRA     @(-1,SP)                ; Return directly
                                            from stack
```

Note the convention of storing the return address first on the stack.

Construction and Operation of the Serial Interface (SIF)

Figure 7:
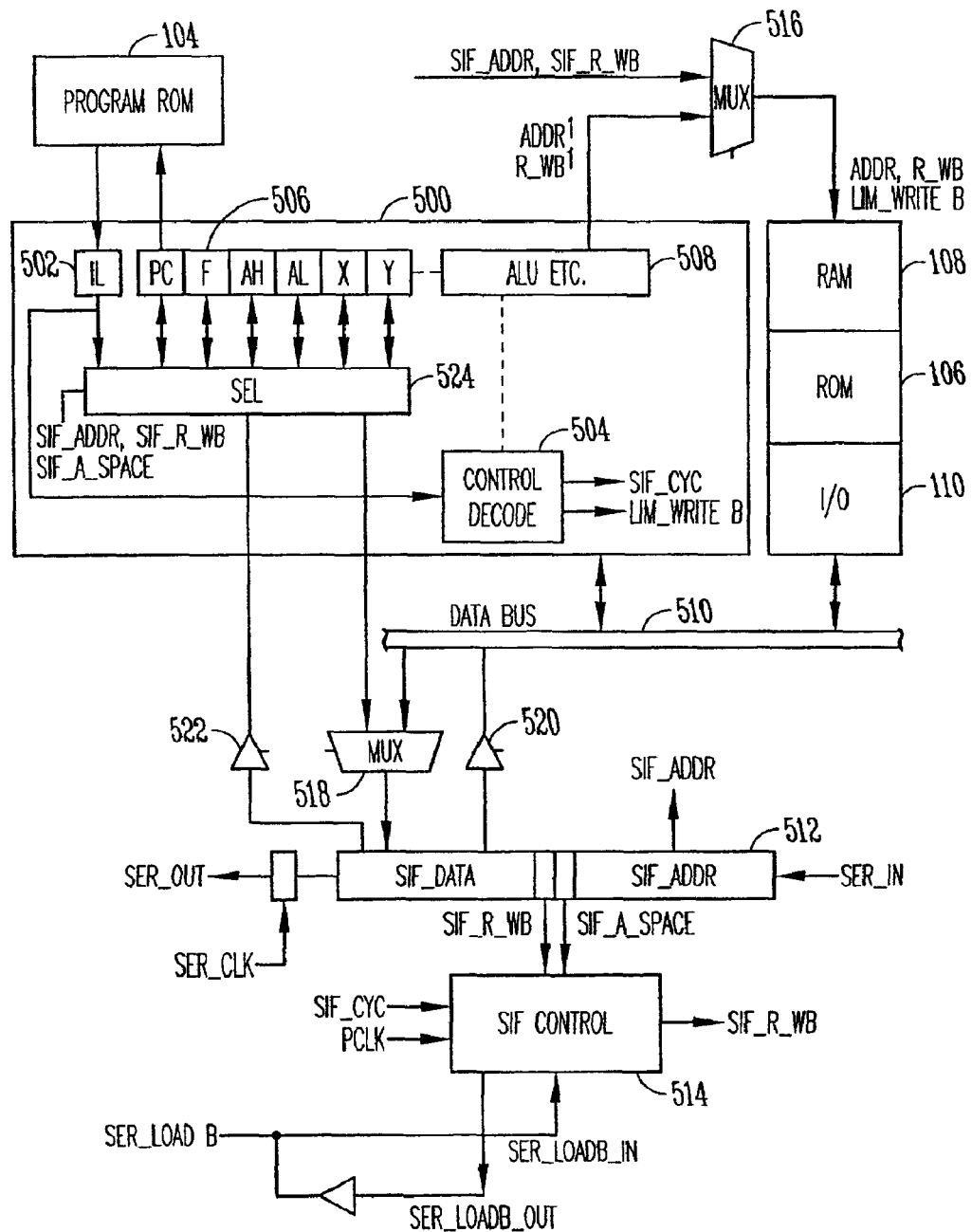
FIG. 7 shows in more detail a shift register of the serial interface of FIG. 6.

As described above with reference to FIGS. 1 to 6, the serial interface (SIF) operates to allow external access to the memory spaces and registers of the processor via the external pins of the integrated circuit. FIG. 7 shows one practical implementation. The processor in FIG. 7 may be the same as that of FIGS. 1 to 6, but could equally be of an entirely different design.

The main part of the processor is illustrated at 500, and is shown schematically connected to the program memory 104, and the data memory and I/O—106, 108, 110. Within the main part of the processor core, an instruction latch 502 receives program instruction words from the program memory 104, which are decoded by a control section 504 of the processor. The registers of the processor are shown at 506. The arithmetic and logic unit (ALU) and other functional units of the processor core are grouped schematically in a block 508. A data bus of the processor is shown at 510. FIG. 7 does not show in any detail the data paths and control lines between the various elements 502 to 510, which can readily be implemented using conventional techniques, for example to implement the functionality detailed above in relation to the instruction set, data architecture and pin description.

The serial interface shift register is physically embodied at 512 and features the data field, address field, read/write field and address space field which are as shown in FIG. 6. In response to the serial interface clock signal SER_CLK, one bit at a time can be shifted from the shift register 512 out of the chip (SER_OUT) and/or into the chip (SER_IN). An interface control block 514 is shown associated with the shift register 512 and the fourth control line of the interface (SER_LOADB), while in practice the control units 504 and 514 of the processor may be implemented as a single functional unit, or further sub-divided as desired.

The address and read/write signals applied to the data memory 106, 108, 110 are primarily supplied (ADDR', R WB') by the normal functional elements 504, 508 of the processor core 500, for example as described in the Pin Description above. However, a multiplexer 516 is provided in these address and control lines, so that the address applied to the memory can instead be that which is contained within the interface register 512 (SIF ADDR). Similarly, the read/write control bit for the data memory can be derived from the relevant bit of the shift register 512 (SIF__R__WB) when the multiplexer 516 is controlled appropriately. In particular, a control line SIF__CYC is driven by the control and instruction decoding section 504 of the processor, so that the multiplexer is activated in this way during the cycle of execution of the special SIF instruction, assuming that the bit SIF__A__SPACE indicates that the data address space is to be accessed in a given SIF operation.

Similarly, a multiplexer 518 and tri-state buffer 520 are driven to cause the data bits of the shift register 512 to be written from or written to the data bus 510, during a SIF write or SIF read operation, respectively. The main part of the processor core 500 ignores the data present on the data bus 510 during the execution cycle of a SIF instruction.

For the case where access to the registers or program memory space of the processor is desired through the serial interface SIF, as indicated by the bit SIF__A__SPACE of the word loaded into the shift register 512, the multiplexer 518, a tri-state buffer 522 and a bi-directional selection circuit 524 provide access between the data bits of the shift register 512 and the internal registers 502, 506 of the processor core 500. The selection circuit 524 is controlled by the lower 4 bits SIF__ADDR[3:0] of the address field within the shift register 512, as detailed in FIG. 6. Therefore, during a SIP instruction execution cycle, any of the registers PC, F (flags), AH, AL, X or Y can be read or written, or the currently addressed location of the program memory 104 can be read via the instruction latch 502. As described already; the program counter value stored in register PC can be incremented automatically to allow sequential access to a range of locations in the program memory 104, when the debug mode is activated. In practice, the selection circuit 524 and multiplexer 518 may readily be combined with existing data path selection components of the processor core 500, to achieve a very compact circuit.

Figure 8:
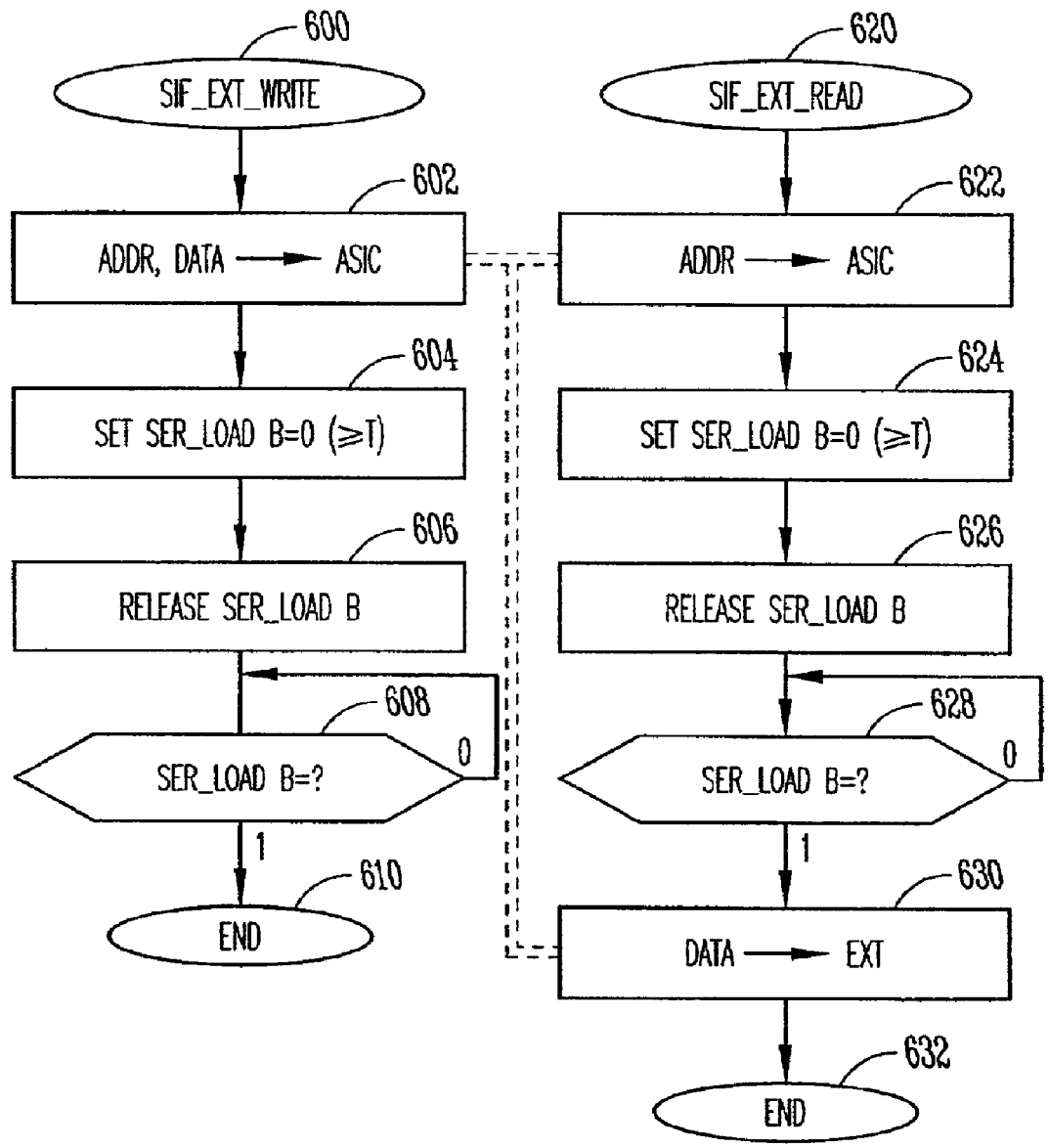
FIG. 8 is a flowchart showing operation of a master apparatus (EXT) in relation to the serial interface of FIGS. 6 and 7.

The particular mode of handshaking between the chip (ASIC) and the external apparatus is explained in the Pin Description above, but will now be further illustrated with reference to FIGS. 8 and 9. In the left hand flow chart of FIG. 8, beginning at 600, the actions of the external apparatus wishing to write a data value into a location within the storage space of the integrated circuit begin at 600. At 602, while the fourth wire SER__LOADB remains high (passive state), the data line SER__IN and the serial clock line SER__CLK are used to load the various bits of the shift register 512 with the ASIC. A matching shift register will typically be provided within the external apparatus for this purpose.

When the shift register on chip contains a complete SIF instruction word, the external apparatus (step 604) sets the fourth wire SER__LOADB to an active value (0) for a long enough time (one clock cycle or more) that the SIF control circuit 514 within the ASIC can recognise that an interface operation is desired. The external apparatus then releases the fourth wire at step 606, and then (step 608) watches the fourth wire to see whether it returns to the passive state (1) or whether it is being held active (0) by the ASIC. Only when the fourth wire returns to the passive state is the SIF write operation considered complete (610).

Figure 9:
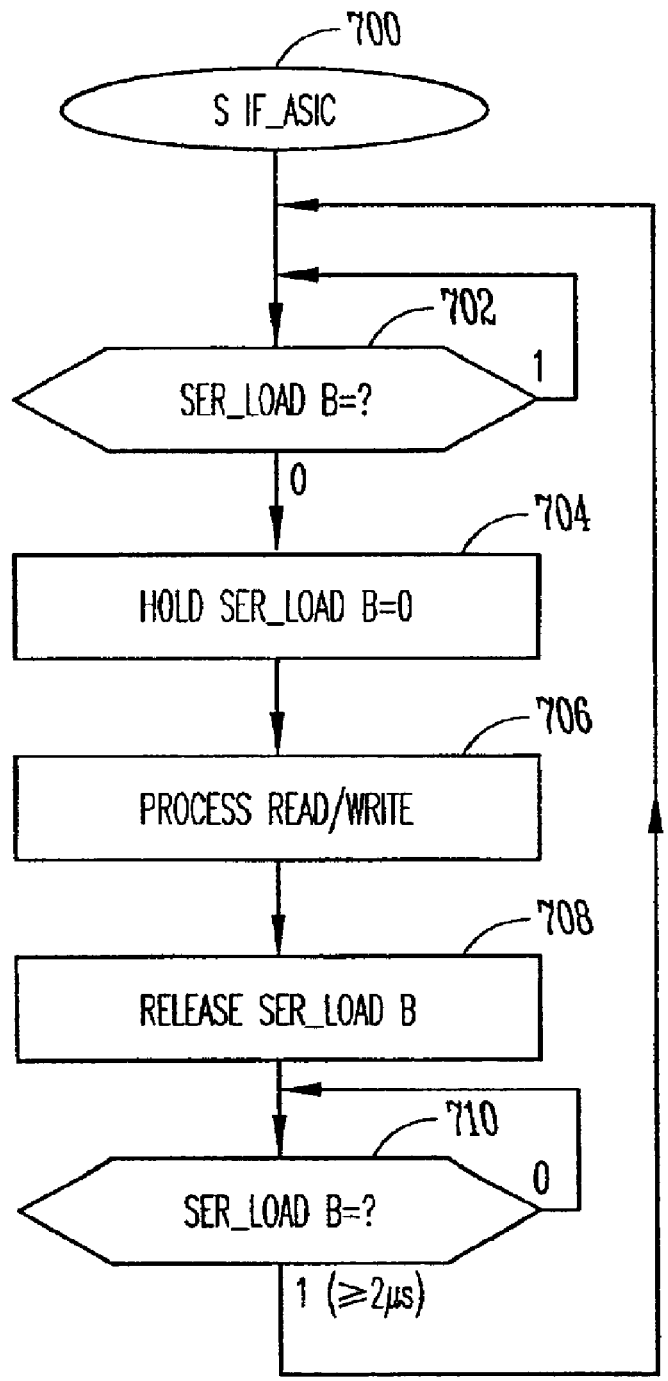
FIG. 9 is a flow-chart showing operation of a slave apparatus (ASIC) in relation to the serial interface.

Referring now to FIG. 9, the operations within the ASIC in relation to the serial interface begin at 700. At 702, the fourth wire SER__LOADB of the interface is monitored by the SIF control unit 514 of the ASIC, until it is seen to enter the active state. At 704, the ASIC immediately actively holds the fourth wire in the active state. At 706, the command which has been loaded into the register 512 of the interface is processed during the next available SIF instruction cycle. When a write instruction is indicated by the bit SIF__R__WB in the register, this causes the DATA field to be written into the storage location of the ASIC determined by the fields SIF__A__SPACE and SIF__ADDR. In the case of a read operation, the DATA bits of the register 512 are loaded with data read from that location. Only after the SIF operation has been processed within the ASIC does the control circuit 514 release the fourth wire of the interface (step 708). This is to inform the external apparatus that the write operation is completed, or that the information to be read can be clocked out of the serial interface now.

It is not guaranteed, however, that the external apparatus will already have released the fourth wire (step 606), and a loop is implemented at step 710 to monitor the state of the fourth wire. Only when this wire is seen to go high again does control return to step 702. In this way, repeated SIF instructions are not implemented merely because the external apparatus is very slow to release the fourth wire.

Returning to FIG. 8, the right hand flow chart beginning at step 620 illustrates the SIF read operation. Steps 622 to 628 are the same as corresponding steps 602 to 608 of the SIF write operation, except that at step 622, no data needs to be clocked into the shift register 512 of the ASIC, saving time. Also, of course, the bit SIF__R WB is set to indicate read instead of write. After it has been detected at step 628 that both the external apparatus and the ASIC have released the fourth wire (SER LOADB=1) the data read from the desired address or register within the ASIC is present in the DATA bits of the shift register 512, and is clocked out of the shift register into the external apparatus in step 630.

Double broken lines in FIG. 6 connect step 630 with step 602 or 622 to illustrate that, if desired, successive SIF operations can be pipelined by performing the step 630 of reading the shift register 512 simultaneously with the step 602 or 622 of loading the register 512, using the data input and output wires SER__IN and SER__OUT in parallel.

Power Saving Features

In a static CMOS or similar circuit implementation, power dissipation arises only during signal transitions. In the processor described above overall power dissipation is greatly reduced, even compared with conventional "low-power" designs, by interposing latches at various stages within long combinational logic data paths including for example the arithmetic and logic unit (ALU). Within each instruction cycle subdivided into a number of 'clock states' S0–S7, the latches are clocked only at a given state of the clock within the cycle, when all data and control lines which form inputs to the relevant stage have settled to a meaningful value. Transient states arising at the inputs of each stage before that time therefore cannot cause superfluous transitions to propagate far within the combinational circuitry of the processor throughout the instruction cycle.

In the example processor of FIGS. 1 to 6, for example, such latches are provided for examples on the current instruction (INSTRN), to isolate the decoder from ripple on the instruction bus. There are also latches on the ALU inputs A, B and C0, and also on the control lines from the instruction decoder 300. In addition to power saving in this way, these and further latches may be used to latch external inputs and to protect against "clock skew" at various points.

Referring again to FIG. 3, it is also a power saving feature of the present processor design that most parts of the data architecture have dedicated data buses, rather than a shared data bus. The DATA bus which leaves the processor core and which is also connected to the SIF register is an exception, in that it is driven by logic with tri-state output buffers 345, 346 etc. However, as described above, the output Σ of the ALU 302 is connected by dedicated pathways to the registers 304 to 310, and the outputs of these registers are similarly connected to the inputs of the ALU by dedicated pathways and multiplexers 320 to 328.

Compared with conventional processor designs in which all such elements are interconnected by means of shared data buses, the present processor design has eliminated many tri-state buffers that would otherwise be required at the outputs of the ALU and registers to drive a common data bus. Also, each dedicated data path has a lower capacitance than the conventional shared bus, with the end result that the power consumption of the processor core is lower.

Figure 10:
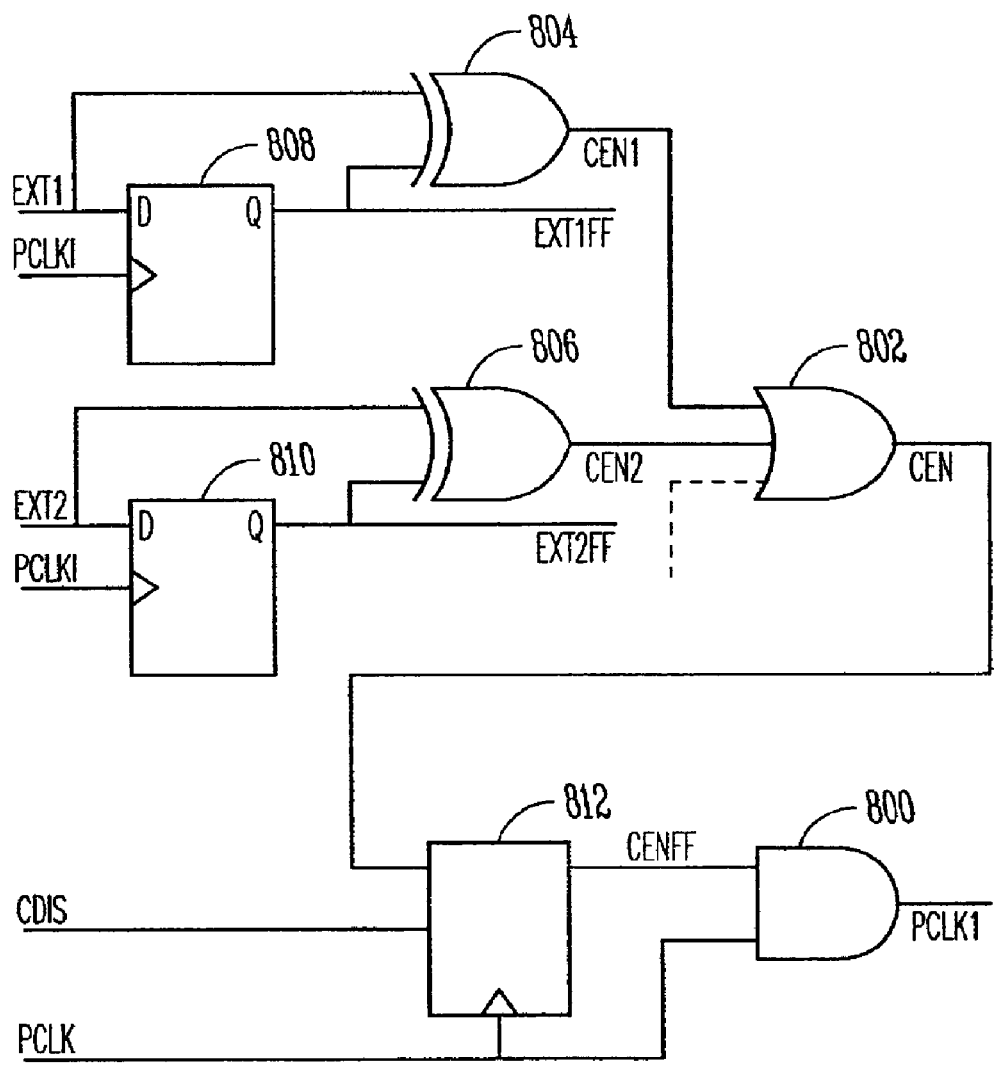
FIG. 10 shows circuitry for monitoring external signals during a sleeping state of the processor of FIGS. 1 to 6.

FIG. 10 shows schematically circuitry implemented for monitoring wake up signals during the SLEEP or STOPPED states of the processor. In these states, the main functional elements of the processor are not clocked by the usual high frequency clock signal (PCLK in this embodiment), to reduce power dissipation in those circuits. On the other hand, external inputs must be monitored to cause the clock signal to be applied once more to these parts. In the present embodiment, signals such as STOPB_IN, RUN_STEP and WAKE_UP must be monitored, and also the SER_LOADB_IN. Any of these may require the processor to perform at least one cycle of operation. In an alternative processor embodiment, external signals indicating interrupt requests may typically need similar monitoring.

FIG. 10 shows the main high frequency clock signal PCLK input to the processor core. This is gated at 800 with a clock enable signal CENFF to generate an internal clock signal PCLKI. The main part of the processor circuitry is driven by PCLKI, so that when CENFF is low, the main processor circuitry is not running and power dissipation is reduced. A trigger circuit 812, however, is perpetually clocked by PCLK. An input on the trigger circuit 812 receives an asynchronous clock enable signal CEN and, at its output, generates the clock enable signal CENFF which is applied-to the gate 800.

Different external signal lines EXT1, EXT2 etc. are to be monitored, and each has its own flip flop 808, 810 etc. and XOR gate 804, 806 etc. for this purpose. The XOR gates 804, 806 produce individual clock enable signals CEN1, CEN2, from which an OR gate 902 generates the combined clock enable signal CEN.

In operation, flip flop 808 has a D input monitoring the external signal EXT1, but is clocked only by the internal clock signal PCLKI (output of gate 800). Therefore, when the processor is stopped or sleeping, the Q output of flip flop 808 carries a signal EXT1FF which is a state of the EXT1 signal, memorised from the last time that the processor was running. At the same time, there is no power dissipation in the flip flop 808. The XOR gate 804 compares the actual input signal EXT1 with EXT1FF, and generates the individual wake up signal CEN=1 as soon as there is any change in the external signal EXT1 relative to EXT1FF. By the operation of OR gate 802, CEN goes high, and the trigger circuit 812 sets CENFF high, enabling the internal clock PCLKI for the entire processor. At this point, the present state of signal EXT1 becomes latched also as EXT1FF, so that the CEN1 signal itself disappears.

A similar operation is provided in relation to input EXT2 by the XOR gate 806 and the flip flop 810. Any number of such inputs can be provided, with the same or different monitoring circuitry.

Compared with a circuit in which, for example, each individual flip flop 808, 810 is clocked by the running clock, PCLK to generate a synchronous clock enabled signal, the present arrangement Achieves a reduced power dissipation in the sleeping or stopped state. Only the clock input of a single flip flop within the trigger circuit 812, in addition to the input of the gate 800, need to be continuously supplied with the running clock PCLK, no matter how many inputs are being monitored. To enter the sleep or stopped state, a clock disable signal CDIS from elsewhere in the control logic of the processor is applied to the trigger circuit 812, which sets CENFF low and so disables the internal clock PCLKI.

Application Example—Domestic Gas Meter WO-A1-95/04258 describes an ultrasonic domestic gas meter apparatus, which measures gas velocity by a "time of flight" principle. To be successful as a domestic gas meter, such a product must be designed for a world market and have different versions conforming to several national standards. It should be powered by batteries which will last more than ten years, even in a wide range of hot, cold, dry and damp environments.

The principles of operation of the ultrasonic gas flow meter, and the measurement algorithms to be implemented are described in more detail in WO-A1-95/04258. Briefly, two ultrasonic transducers of the gas flow meter are used both to transmit and receive ultrasonic pulses. One transducer is installed upstream of the gas flow in the meter, the other downstream. In operation, the upstream transducer sensor sends an ultrasound pulse to the downstream transducer, and the time of flight for this pulse is measured with very high precision. Then the downstream transducer sends the pulse to the upstream transducer, and the time of flight is again measured. If the gas velocity is zero, both readings will be the same. However, as the gas flow increases, the time of flight downstream will become shorter than the time of flight upstream. From this information it is possible to calculate the gas velocity but only with sophisticated signal processing. Such readings are taken every few seconds, and the accumulated volume of gas which has flowed is updated.

The signal processing electronics of the gas meter are therefore required to drive and receive signals from an ultrasonic transducer, to make very accurate time and voltage measurements, to perform sophisticated signal processing and yet be flexible enough to pass the requirements of several national standards. At the same time, the circuitry should run at a very low voltage, have a very low average current consumption, have a very good long term reliability and very low unit cost when manufactured in high volume.

Nowadays an ASIC (custom IC chip) solution might naturally be adopted to implement a specialised instrument of this type, and CMOS ASIC processes in particular are known to provide many advantages such as low cost and low power consumption. The use of this technology enables the development for example of custom analog cells to drive and receive signals from the ultrasonic transducers.

However, the extreme low power consumption desired in the this example product can only be obtained when the program controlled processor which implements the signal processing and control functions is also integrated, with its program store, on the same chip. Also, having the processor on-chip would reduce interference emissions and reduce susceptibility to interference from outside. Aside from the obvious benefits of compliance with EMC regulations with less shielding, higher emissions within the product would impair the accuracy of the measurement electronics.

Unfortunately, as mentioned in the introductory part of this application, conventional processor designs tend to be too expensive in terms of chip area, and/or are not powerful enough per instruction for arithmetic-intensive applications. Large circuit size and high processor clock speed will only increase the power consumption. The problem of verification of the design also arises when all components and the control program are fixed in the chip hardware, and when the program implements real-time operations. It will not normally be possible with conventional designs to be sufficiently confident in the design and programming to commit both to hardware. Finally, when the design is completed, it must contain explicit provision for any product modifications that may be necessary in the future.

The novel processor design described above largely overcomes these drawbacks, while the processor and serial interface can be provided as one or two cells in an ASIC design "library", to be incorporated in a wide range of designs.

Figure 11:
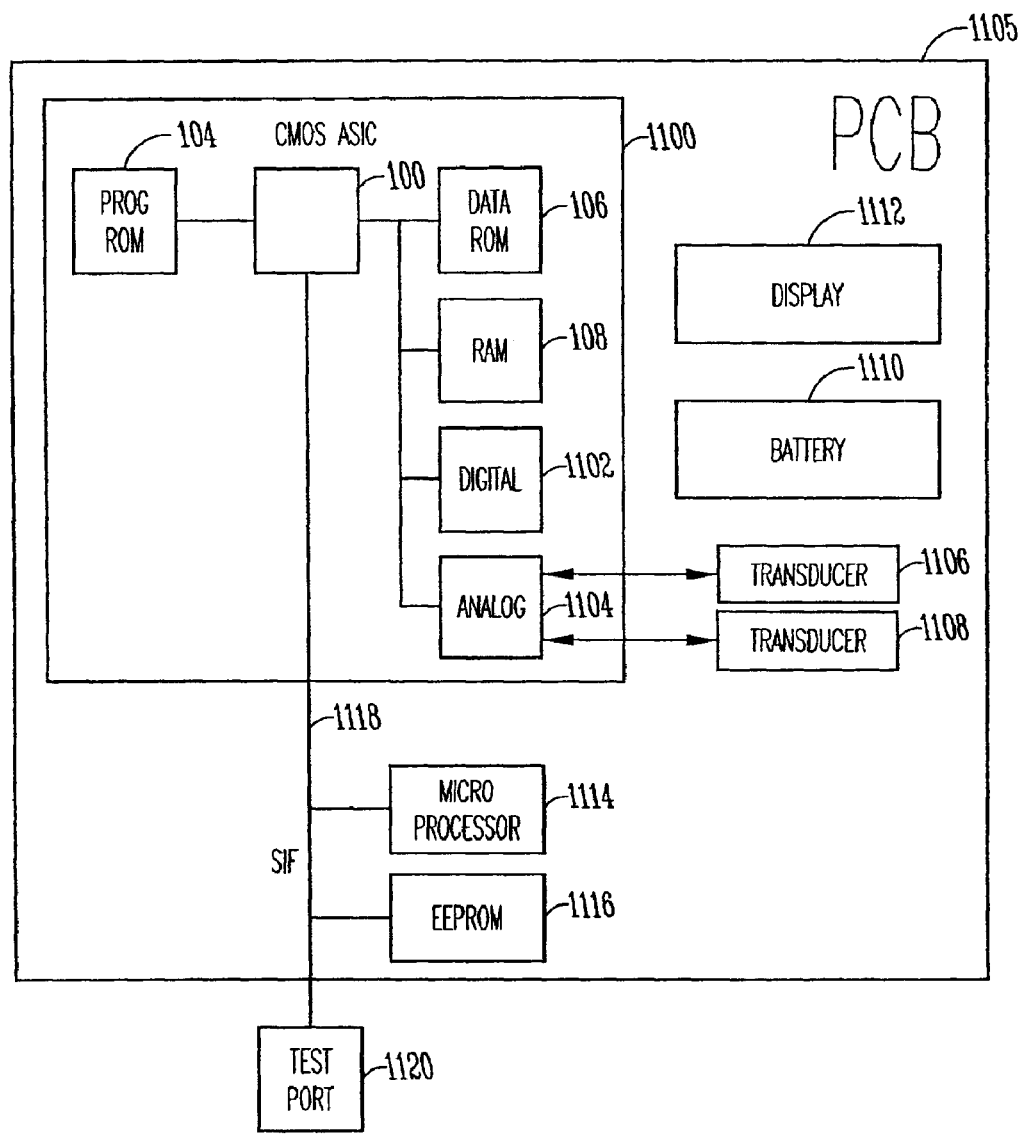
FIG. 11 is a schematic diagram of the electronics for a domestic gas meter, including the novel processor.

FIG. 11 shows schematically the arrangement of the electronics for such a gas meter in which a CMOS ASIC 1100 includes a data processor of the type shown in FIG. 1. The ASIC includes processor core 100, program memory 104, data ROM 106 and data RAM 108. ASIC 1100 also includes specialised digital circuitry 1102 for signal processing and control functions and also specialised analog circuitry 1104, including transducer drivers, switches and digital-to-analog converters. On the same printed circuit board 1105 are connections for ultrasonic transducers 1106 and 1108, a 3 volt Lithium battery 1110, a small liquid crystal display 1112, a conventional low cost microprocessor chip 1114 and some electrically erasable, programmable non-volatile memory (EEPROM) 1116. These last two components communicate with ASIC 1100 via the serial interface (SIP) 1118, which also provides a test port 1120 for the gas meter electronics.

In performing signal processing, the powerful 16 bit arithmetic functions with the 32 bit accumulator register allow the algorithms to be implemented with a minimum of power consumption. Also, the digital circuitry 1102 provides integrated hardware for the high speed and repetitive processing of data from the analog circuitry 1104.

Reliable running at very low voltage, for example outside in very cold weather at the end of the life of the Lithium battery 1110, is more readily achieved with an integrated solution, since the entire ASIC design can be characterised for low voltages which would not be possible using various standard components. Average power consumption is reduced greatly by giving the ASIC 1100 control over the power supplies to the components 1112 to 1116. The processor core consumes very low power when it is in the sleeping state, and zero power when the clock signal PCLK is stopped. Simple timing circuitry on the ASIC can be provided to start the processor clock only intermittently, when measurements are required to be taken, and the processor 100 when running can take further control of the other circuity of the ASIC 1100 and the printed circuit board 1105, activating only those circuits which are required at a given time. The power consumption of the,processor is very low even when it is running, due to various features mentioned above. Furthermore, because the arithmetic instructions are powerful for the size of the processor, the processor does not need to execute so many instructions for a given calculation.

To maintain economies of scale while providing a domestic gas meter that can meet different national standards and allow several product variants, the ASIC 1100 (including its stored program) should be the same for all such variants. This would not be achieved readily in conventional microprocessor architecture, but in the present example the difference between the products is implemented in the low cost external microprocessor 1114 and the EEPROM 1118. This can be changed (re-programmed) at a much later stage in product development, as each new requirement comes to light, or even after installation in the field. The serial interface 1118 enables the external microprocessor 1114 to have direct read and write access to the memory space in the ASIC, so that parameters of the measuring process can be changed as necessary. It is an advantage of the serial interface design presented herein that, at the time of fixing the ASIC design and programming, it need not be determined to which memory locations the external microprocessor will need to have access. Therefore, there is great flexibility for unforeseen modifications in the product development.

The novel processor and interface architectures allow "verifiable" design and programming, so that the risk of errors in the final ASIC can be reduced, despite the integration of processor and program ROM on-chip. Flexibility of the design for future product requirements is open, by means of the serial interface.

With regard to cost, the processor core 100 can be very small (only 3000 gates), requiring only about 1 $mm^2$ of silicon. The unit cost of such a silicon area, in volume manufacture, is about £0.15 at the present filing date, while it is not possible to buy a standard external 16 bit microprocessor for such a low price. Furthermore, by implementing so many components on the ASIC, the product has very few components in total, giving very low PCB, assembly and test costs. Reliability is also enhanced, because failures in electronics tend to happen because of broken or poor connections, and the number of connections in the design of FIG. 11 is very low.

Further Notes

Those skilled in the art will recognise that the detailed implementation of a microprocessor or other circuit embodying any aspect of this invention need not be limited to the examples given above. Of course the details of the instruction set can be changed to suit a given application, the widths of address and data busses, and the widths of various fields in the instruction word of the processor can be changed also. Even at a more general level, the scope of the present invention encompasses many individual functional features and many sub-combinations of those functional features, in addition to the complete combination of features provided in the specific embodiment. Whether a given functional feature or sub-combination is applicable in a processor having a different architecture, for example a processor with pipelined instruction decoding and execution, will be readily determined by the person skilled in the art, who will also be able to determine the adaptations or constraints imposed by the changed architecture.

It will also be appreciated, that, whereas the program instructions and initial data for the processor operation are permanently fixed in RON storage on-chip, embodiments are perfectly feasible for prototyping and/or final production in which the ROM is replaced by $E^2$PROM (electrically erasable programmable read only memory) or one-time-programmable ROM, where the processes used for manufacture (and the costs) will permit.

All or part of the program store may in some cases need to be off-chip. If the pin count associated with the architecture is too high, it may be reduced for example by providing an 8-bit program ROM, and performing multiple accesses to build up each instruction word.

Concerning the novel architecture for arithmetic operations, the provision of the 32-bit shift unit separately from the 16-bit ALU allows a combination of high signal processing performance and small circuit size. A conventional processor having shift functions in the ALU would typically provide a 32-bit wide ALU or forego the 16×16 multiply and divide instructions. Of course, the ALU of the present processor could be provided with 16-bit shift functions if desired.

Also, although a single bit shift function has been provided in the above embodiment, requiring n cycles for an n-bit shift, there is also the possibility to include a "barrel shifter" to allow n-bit shifts in a single cycle. The choice of 1-bit or n-bit shift circuitry is a trade off between desired processing speed and circuit size.

Concerning the serial interface (SIF) described above, it will be apparent that similar functions can be performed by other types of serial or parallel interface, and it will also be apparent that the SIF connections and protocols can be applied for communication between different apparatuses or devices which need not be ASICs or in any way similar to the above described processor.

Other standard interfaces well known in the art are the $I^2C$ 2-wire interface of Philips Electronics NV, the SPI interface of Motorola Corp., and the SCI interface of Hitachi. The SIF described above can readily be interfaced, for example, to a Motorola processor (for example MC68HC11) having an SPI type interface. Another interface known in the art is the "Microwire" interface of National Semiconductor Corp, with particular application to $E^2PROM$ components.

The SIF described above has the advantage of a very simple and robust structure and protocol, with a single master, and can be used in many of the same applications as the known interfaces mentioned above.

Although the Microwire interface defines a simple fixed master and slave relationship, the known interfaces like $I^2C$ and Microwire impose fixed word lengths and strict timing constraints on the slave device. The SIF as described herein allows variable word lengths, and each of master and slave can take as long as it needs to respond to the interface. This avoids the need to interrupt the flow of control in the ASIC at short notice, in response to unpredictable external stimuli, thereby simplifying the design and verification of new ASIC designs. In particular, the programmer of the present ASIC can keep track of real time supply by calculation from the clock speed and known instruction execution times. In a conventional processor design, where interrupts may occur in response to external stimuli, the current location in the program is no guide to elapsed real time, and other timer mechanisms, typically implemented by further interrupts, are required to implement real-time dependent operations. Also, since there is no speed constraint, the SIF can be used to read values from any of the memory-mapped I/O devices, which might require a lengthy wait for response from some off-chip peripheral (keyboard or sensor).

Figure 12:
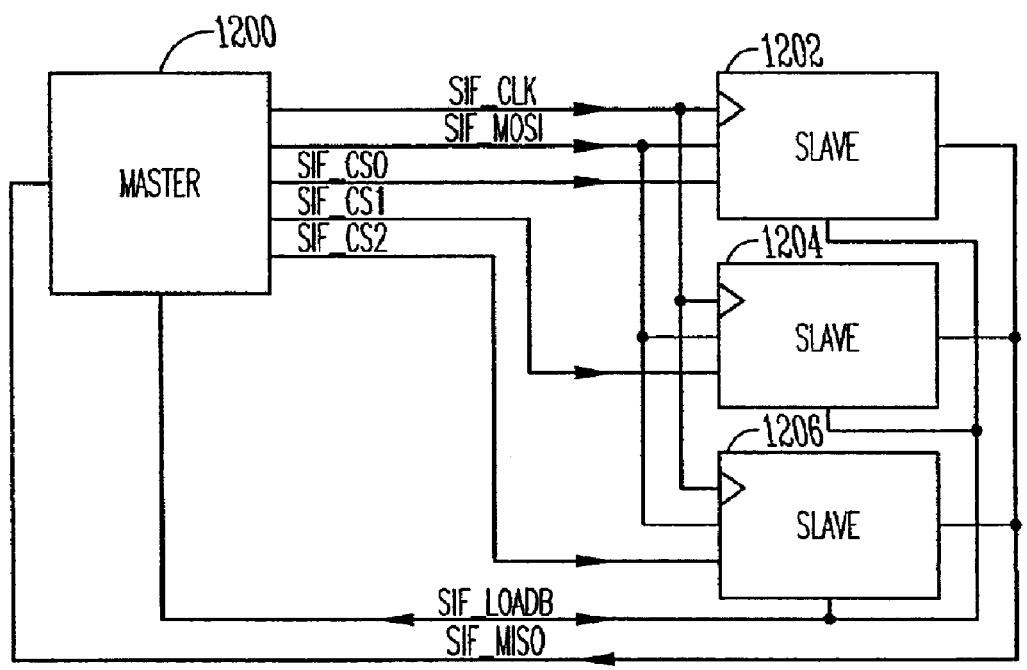
FIG. 12 shows a modification of the serial interface of FIGS. 6 and 7, allowing multiple slave devices.

FIG. 12 shows how it is possible to enable the SIF architecture to allow a microcomputer to address plural slave ASICs, for example by providing a separate "chip select" line CS to each slave. The data and clock lines then become effectively a serial data bus. However, unlike conventional serial buses, each slave is free to define its own word length, according to need. Therefore, a slave need not provide a 36-bit shift register when only eight bits are ever needed by that slave, and the master need not waste time sending more bits than necessary to any slave. In FIG. 12, an external microprocessor 1200 is shown as master, while three ASIC devices 1202, 1204 and 1206 are shown as slaves. The serial databus comprises a common clock line SIF_CLK. The serial data line which inputs to the slaves is shown as SIF_MOSI ("master out, slave in") while the common data line on which data is output by the slaves is shown as SIF_MISO ("master in, slave out"). The bi-directional control line SIF_LOADB is shown connected in common to all devices, and corresponds to the control line SER_LOADB of the earlier described embodiments. The master 1200 also has individual chip select outputs SIF_CS0, SIF_CS1 and SIF_CS2, connected to chip select inputs of the slaves 1202, 1204 and 1206 respectively.

In operation, when SIF_CS is low for a given slave ASIC, the SIF_MISO connection of that slave is put into its high impedance state using a tri-state buffer, and also the SIF_LOADB output of that slave is put in the high impedance state, using the tri-state buffer already provided (see FIG. 7). In the present embodiment, the chip select signal does not affect SIF_CLK or SIF_MOSI in any way. Therefore, it is still possible to clock new data into the shift register of the interface, even when the chip select is low. However, the data output of the slave SIF_MISO is disconnected from the register, so that no data will be clocked out.

When the chip select is low, the slave will also ignore SIF_LOADB when it is pulled low by the master, and in particular will not latch SIF_LOADB low and will not queue up a SIF access operation for the next SIF instruction cycle.

When SIF_CS is high for a given slave, however, than the SIF_MISO output is enabled, and the SIF_LOADB output line input/output is enabled in exactly the manner described above with respect to FIG. 7. Extension of the interface handshake mechanism to provide for plural masters is equally feasible, but will not be described herein.

Another possible modification of the SIF described above concerns the SIF read operation. Since no address value needs to be present in the shift register bits SIF_ADDR [15:0] when the value is readout of the ASIC, it would be possible for example for every SIF read operation to provide access not only to the particular memory location requested, but also to supply a fixed set of status values such as the flags register or program counter PC. These values could be available at little extra cost, being loaded into the address field of the interface register at the same time as the data field is loaded, and need not be clocked out by the external device if they are not of interest.

Another feature of the SIF type of interface is that the separate data input and output wires SER_IN and SER_OUT can be used simultaneously to read data from the ASIC and to load another word into the SIF shift register on the ASIC, to set up the next read or write operation. This potential for parallel operation of SER_IN and SER_OUT at each cycle of the clock SER_CLK is illustrated by the double broken lines in between the flowchart step 630 and the step 602 or 622 in FIG. 8, and can be applied in other interfaces having a separate data wire for each direction.

An interface of the SIF type can also be employed in an apparatus having memory and CPU (central processing unit) on different chips. The SIF shift register and the multiplexer which governs access to the address bus could then be provided by components internal or external to either chip.

Concerning the SIF instruction in the processor instruction set described above, it will be apparent that the concept of releasing the memory address bus or register addressing circuitry for external access during a particular instruction (effectively an NOP instruction) is broadly applicable to a wide range of processor architectures. Such a concept can provide both testability and off-chip communications for normal operation in a single functional unit. Similarly, the scheme of hand-shaking provided by the SER_LOADB line in the SIF interface circuitry can be applied in a wide range of interface types, and is particularly advantageous where the speed and timing capabilities of two devices wishing to communicate are either unknown or anyhow widely disparate.

Also, rather than depending on the presence of stop state or a specific SIF instruction code within the stored program the processor sequencing circuitry can simply provide a regular time window, for example one cycle every 128 cycles, in which memory is addressed by the SIF and not by the processor itself.

Alternatively, or in addition, the SIF instruction code may be replaced by a family of instruction codes, allowing different types of serial interface access. For example, a programmer may be happy to allow SIF read operations more often during the running of the program than SIF write operations. In such a case, separate instructions SIF_READ_ONLY (allowing the interface only to read from the memory space) and SIF_ALL (allowing both read and write operations) might be defined, for example. Then, if a SIF_WRITE instruction is received via the interface, this will only be processed during the next SIF_ALL cycle, irrespective of how many SIF_READ_ONLY cycles may have been executed in the meantime. Similarly, different instructions might be provided to allow access to different parts of the process of address space at different times. Of course, for each instruction of this type, it is still the case that the programmer determines only the timing of the memory access, while the specific memory access operation desired is defined by the external apparatus.

The de-bug control circuitry, featuring the control lines STOPB and RUN_STEP is similarly applicable in a wide range of processor architectures and applications. While this control mechanism is particularly useful in combination with the serial interface functions described, these features are also of use independently. The provision of a breakpoint instruction (BRK above) which is conditional on the existence of the de-bug mode is also advantageous in itself, particularly where the microprocessor control program is stored in ROM memory on chip. As described above, the breakpoint instruction BRK can be present in all prototype and final versions of the stored program, but will be effectively ignored by the processor during normal operation.

The SLEEP operation, being defined in the instruction set, also gives the programmer control of the point in program execution at which the SLEEP rate will be entered. Even when the SLEEP state is to be commanded from outside the processor, using the WAKE_UP signal line, it will always be delayed until the processor is at a certain point in the program execution, which allows a more verifiable design. Similarly, the processor will always wake up at a known point in the program, which in this embodiment is the instruction after SLEEP.

The above and other generalisations will be obvious to the skilled reader and are within the scope of the present invention. Although various specific aspects of the invention are defined above and in the attached claims, the applicant reserves the right to claim any novel feature or novel combination of features disclosed explicitly or implicitly herein.

What is claimed is:

1. A processor embedded with other circuitry as part of an application specific integrated circuit, the processor comprising:

a control circuit operable to control operations within the processor in accordance with a stored program, the program comprising stored instructions selected from a predetermined instruction set;

a plurality of registers for storing calculated values;

an addressing circuit operable under control of the stored instructions to perform addressing operations addressing a data storage space of the processor, at least one said registers being operable as an address register as part of the addressing circuit for storing calculated address values for use in said addressing operations;

a common arithmetic unit having input and output data paths each of width n bits, and being operable under control of the stored instructions both to calculate general data values in co-operation with the registers, and to calculate address values in co-operation with said address register;

wherein at least one of said registers is operable as a wide data register of width substantially greater than n bits for storing results of arithmetic operations wider than n bits; and a shifting circuit of said greater width is interposed between the output path of the arithmetic unit and the wide data register, with a feedback path also of said greater width from data outputs of the wide data register, and is operable under control of the stored instructions to generate a shifted result of said greater width in the wide data register in response to at least a multiplication, division or normalisation instruction, by repeated operation of the arithmetic unit in cooperation with the shifting circuit and the wide data register.

2. A processor according to claim 1, wherein said wide data register comprises a pair of data registers (AH,AL) each of width n, independently connectable to an input or output path of said arithmetic unit.

3. A processor according to claim 1, wherein said control circuit is responsive to a predetermined multiplication instruction to control the arithmetic unit, the shifting circuit and the wide data register so as to multiply two values of width n bits, the result being obtained in the wide data register after plural operating cycles of the arithmetic unit and the shifting circuit, the number of cycles being independent of the actual values being multiplied.

4. A processor according to claim 1, wherein said control circuit is responsive to a predetermined division instruction to control the arithmetic unit, the shifting circuit and the register so as to divide two values of width n bits, the quotient and remainder being obtained in the wide data register after plural operating cycles of the arithmetic unit and the shifting circuit, the number of cycles being independent of the actual values being divided.

5. A processor according to claim 1, wherein the shifting circuit can perform only single bit position shifting per operating cycle.

6. A processor according to claim 1, formed in an integrated circuit together with program storage and data storage space addressable independently via respective address buses of the processor, wherein the processor is arranged to execute instructions that have been selected from the instruction set and stored in the program storage space of the integrated circuit.

7. A processor according to claim 1, wherein the instructions of the instruction set are of fixed length.

8. A processor according to claim 1, wherein the execution of each instruction takes a number of processor execution cycles, dependent on the type of instruction, and wherein a further instruction is not executable until such instructions are completely executed.

9. A processor according to claim 1, wherein, to the extent that it can be provided under program control, data communication externally of the processor is possible only via the data storage address space.

10. A processor according to claim 1, wherein an instruction to store data from one of said data registers to said data storage space is executed using a data path not including the arithmetic unit.

11. A processor according to claim 1, wherein dedicated unidirectional data paths are provided (i) between the register outputs and an input path of the arithmetic unit and (ii) between the arithmetic unit output data path and the register input.

12. A processor according to claim 11, wherein a further dedicated path is provided to one address register (X) of the processor from a program counter register (PC), said data path including an incrementer, so as to store a subroutine return address.

13. A processor according to claim 1, without an interrupt routine execution handling facility.

14. A processor according to claim 1, further comprising an interface for receiving a communication request from external circuitry, the processor being responsive to such a communication request only during predetermined time periods during normal program controlled operation.

15. A processor according to claim 14, wherein said predetermined periods are defined by inclusion of a predetermined communication instruction in the stored program.

16. A processor according to claim 1, wherein the processor has at least one external control line, and wherein at least one instruction of the instruction set is decoded differently depending on a signal present on the external control line.

17. A processor according to claim 1, wherein the processor has a basic instruction cycle sub-divided into plural internal clock states, and wherein, for at least one combinational logic circuit having plural input lines and functioning under control of each stored program, sample and latch circuits are provided to sample and latch input values for the combinational logic circuit only at a defined state or states within the instruction cycle.

18. A processor according to claim 17, wherein said combinational logic circuit comprises the arithmetic unit of the processor.

19. A processor according to claim 18, wherein said combinational logic circuit further comprises an instruction decoding circuit of the control circuit.

20. A processor according to claim 1, wherein n is sixteen.

21. A processor according to claim 1, adapted to operate under control of a program including a pre-stored linear sequence of instructions and a high frequency clock signal, the processor further comprising a power control circuit operable to implement a state of low power consumption in which execution of said program is suspended, and operable to end said suspended state so that execution of said program continues from the next instruction in the stored sequence without execution of instructions stored outside said sequence.

22. A processor according to claim 21, wherein said suspended state is entered in accordance with a signal (WAKE_UP) applied to the processor, but only at a point in the instruction sequence defined by inclusion of a specific instruction.

23. A processor according to claim 1, adapted to operate synchronously under control of a high frequency clock signal, the processor further comprising:

a power control circuit operable to impose a state of low power consumption in which execution of said program is suspended and said clock signal is isolated from the processor circuitry, while the clock signal continues running; and a monitor responsive to any of a plurality of external signals and operable to end said suspended state by re-applying said clock signal to the processor, wherein said monitor comprises:

plural individual monitoring circuits for detecting predetermined changes in respective ones of the external signals; and a common trigger circuit responsive to outputs of the individual monitoring circuits and operable to re-apply said clock signal to the processor, and wherein the individual monitoring circuits, but not the common trigger circuit, are isolated from the running clock signal during said suspended state.

24. A processor according to claim 23, wherein at least one of said individual monitoring circuits comprises:

a storage circuit responsive to said clock signal prior to the suspended state and operable to store a value of the corresponding external signal; and an asynchronous circuit operable, during the suspended state, to compare the external signal with the value stored by said storage circuit.

25. A processor according to claim 1, wherein the integrated circuit has at least one external control line (RUN_STEP), and wherein at least one instruction (BRK) of the instruction set is an instruction which will either halt the program-controlled processing operations or will effect no meaningful operation, depending on a signal on said external control line.

26. A processor according to claim 25, comprising an output (RUN_STEP) operable to signal externally that execution has been halted.

* * * * *